United States Patent [19]

Onari et al.

[11] Patent Number: 5,189,621
[45] Date of Patent: Feb. 23, 1993

[54] ELECTRONIC ENGINE CONTROL APPARATUS

[75] Inventors: Mikihiko Onari, Kokubunji; Motohisa Funabashi, Sagamihara; Teruji Sekozawa, Kawasaki; Makoto Shioya, Tokyo, all of Japan

[73] Assignee: Hitachi, Ltd., Tokyo, Japan

[21] Appl. No.: 622,217

[22] Filed: Dec. 3, 1990

Related U.S. Application Data

[63] Continuation of Ser. No. 233,209, Aug. 17, 1988, abandoned, which is a continuation-in-part of Ser. No. 46,388, May 6, 1987, Pat. No. 4,853,720.

[30] Foreign Application Priority Data

Aug. 19, 1987 [JP] Japan .................. 62-204006
Oct. 28, 1987 [JP] Japan .................. 62-270202

[51] Int. Cl.$^5$ .................. G06F 15/20; F02D 41/00; B60K 41/00
[52] U.S. Cl. .................. 364/431.04; 364/431.03; 364/148; 123/480; 395/905
[58] Field of Search .................. 364/431.01, 431.03, 364/431.04, 431.05, 424.01, 148, 150, 151, 152, 154; 123/480, 350; 395/905

[56] References Cited

U.S. PATENT DOCUMENTS

| | | | |
|---|---|---|---|
| 4,058,796 | 11/1977 | Oishi et al. | 340/679 |
| 4,346,776 | 8/1982 | Taplin | 123/342 |
| 4,439,824 | 3/1984 | Mayer | 364/424.01 |
| 4,597,049 | 6/1986 | Murakami | 364/431.07 |
| 4,727,838 | 3/1988 | Oshiage et al. | 123/399 |
| 4,729,356 | 3/1988 | Kaneko et al. | 123/399 |
| 4,747,055 | 5/1988 | Eto et al. | 364/424.01 |
| 4,763,745 | 8/1988 | Eto et al. | 364/174 |
| 4,773,010 | 9/1988 | Suzuki et al. | 364/424.05 |
| 4,773,012 | 9/1988 | Ito et al. | 364/424.01 |
| 4,829,434 | 5/1989 | Karmel et al. | 364/424.1 |
| 4,853,720 | 8/1989 | Onari et al. | 364/431.07 |

FOREIGN PATENT DOCUMENTS

| | | |
|---|---|---|
| 0059586 | 2/1982 | European Pat. Off. . |
| 0144608 | 6/1985 | European Pat. Off. . |
| 3715423 | 11/1987 | Fed. Rep. of Germany . |
| 2047361 | 11/1980 | United Kingdom . |
| 2151049 | 7/1985 | United Kingdom . |

OTHER PUBLICATIONS

U.S. Ser. No. 55,530, filed May 29, 1987.
U.S. Ser. No. 155,391, filed Feb. 12, 1988.

*Primary Examiner*—Vincent N. Trans
*Attorney, Agent, or Firm*—Fay, Sharpe, Beall, Fagan, Minnich & McKee

[57] ABSTRACT

An electronic engine control apparatus includes: a plurality of first sensors for detecting the driving action taken in accordance with a driver's intent; a plurality of second sensors for detecting the operating conditions of a vehicle and an engine; a plurality of actuators for controlling the engine; a unit for discriminating the driver's intent of how to drive the vehicle based on output signals from the first and second sensors; and a unit for controlling the engine to match the driver's intent by selectively adjusting at least one of the actuators, in accordance with the discriminated driver's intent.

59 Claims, 17 Drawing Sheets

FIG. 1A

CHARACTERISTIC DRIVING ACTIONS DEPENDENT ON DRIVER'S PREFERENCES & DRIVING ENVIRONMENT

| | DRIVER'S PREFERENCE | | | | DRIVING ENVIRONMENT | | | |
|---|---|---|---|---|---|---|---|---|
| | GENTLE (Ge) | NORMAL (No) | SPORTY (Sp) | | CONGESTED (CG) | URBAN STREET (St) | MOUNTAIN ROAD (Mt) | HIGHWAY (Hw) |
| THROTTLE VALVE OPENING DEGREE $\theta_{th}$ | ◎ SMALL AS A WHOLE | MIDDLE WITH SLIGHT FLUCTUATION | LARGE AS A WHOLE | | ○ SMALL | MIDDLE AS A WHOLE | LARGE AS A WHOLE | MIDDLE AS A WHOLE |
| $\Delta\theta_{th}$ | ◎ SMALL | MIDDLE | ◎ LARGE | | ○ SMALL | LARGE | LARGE | SMALL |
| VEHICLE SPEED $v$ | LOW | MIDDLE | HIGH | | ◎ LOW | LOW ~ MIDDLE | LOW ~ MIDDLE | ◎ HIGH |
| ENGINE SPEED $N$ | ○ SMALL | ○ MIDDLE | LARGE | | SMALL | MIDDLE | MIDDLE ~ HIGH | MIDDLE ~ HIGH |
| $G, \left(\dfrac{dN}{dt}\right)$ | HIGH SPEED SIDE | MIDDLE SPEED SIDE | LOW SPEED SIDE | | ○ LOW SPEED | MIDDLE SPEED SIDE | LARGE | SMALL |
| GEAR POSITION (GP) | | | | | | | LOW SPEED SIDE | ○ HIGH SPEED |

FIG. 1B

| | DRIVER'S PREFERENCE | | | | DRIVING ENVIRONMENT | | | |
|---|---|---|---|---|---|---|---|---|
| | GENTLE (Ge) | NORMAL (No) | SPORTY (Sp) | CONGESTED (CG) | URBAN STREET (St) | MOUNTAIN ROAD (Mt) | HIGHWAY (Hw) | |
| SHIFT ACTION | FREQUENCY | HIGH | LOW | MIDDLE | HIGH | MIDDLE | HIGH | LOW ○ |
| | TIMING | QUICK SHIFT-UP SLOW SHIFT-DOWN | MIDDLE | SLOW SHIFT-UP QUICK SHIFT-DOWN | | | SLOW SHIFT-UP QUICK SHIFT-DOWN | |
| | TIME MAINTAINED AT NEUTRAL POSITION | LONG | MIDDLE | SHORT | | | SHORT | |
| SPEED FLUCTUATION | | SMALL | MIDDLE | LARGE | LARGE | MIDDLE | LARGE | SMALL ◎ |
| STEERING ROTARY SPEED | | LOW | MIDDLE | HIGH | LOW ○ | ○ MIDDLE | HIGH ○ | LOW ○ |
| BRAKE FREQUENCY | | LOW | MIDDLE | HIGH | HIGH | | HIGH | LOW ○ |

◎ VERY LIKELY
○ SLIGHTLY LIKELY

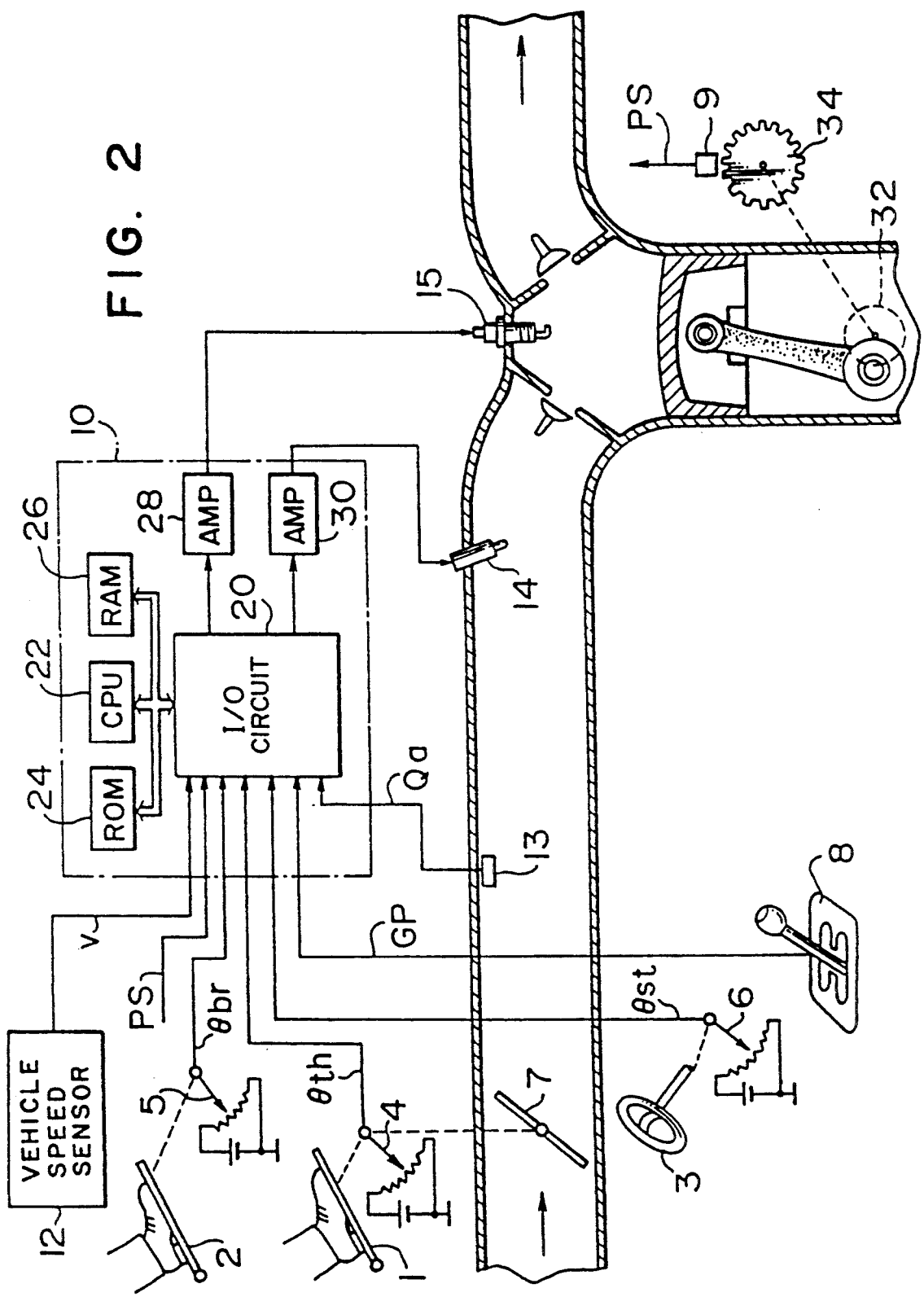

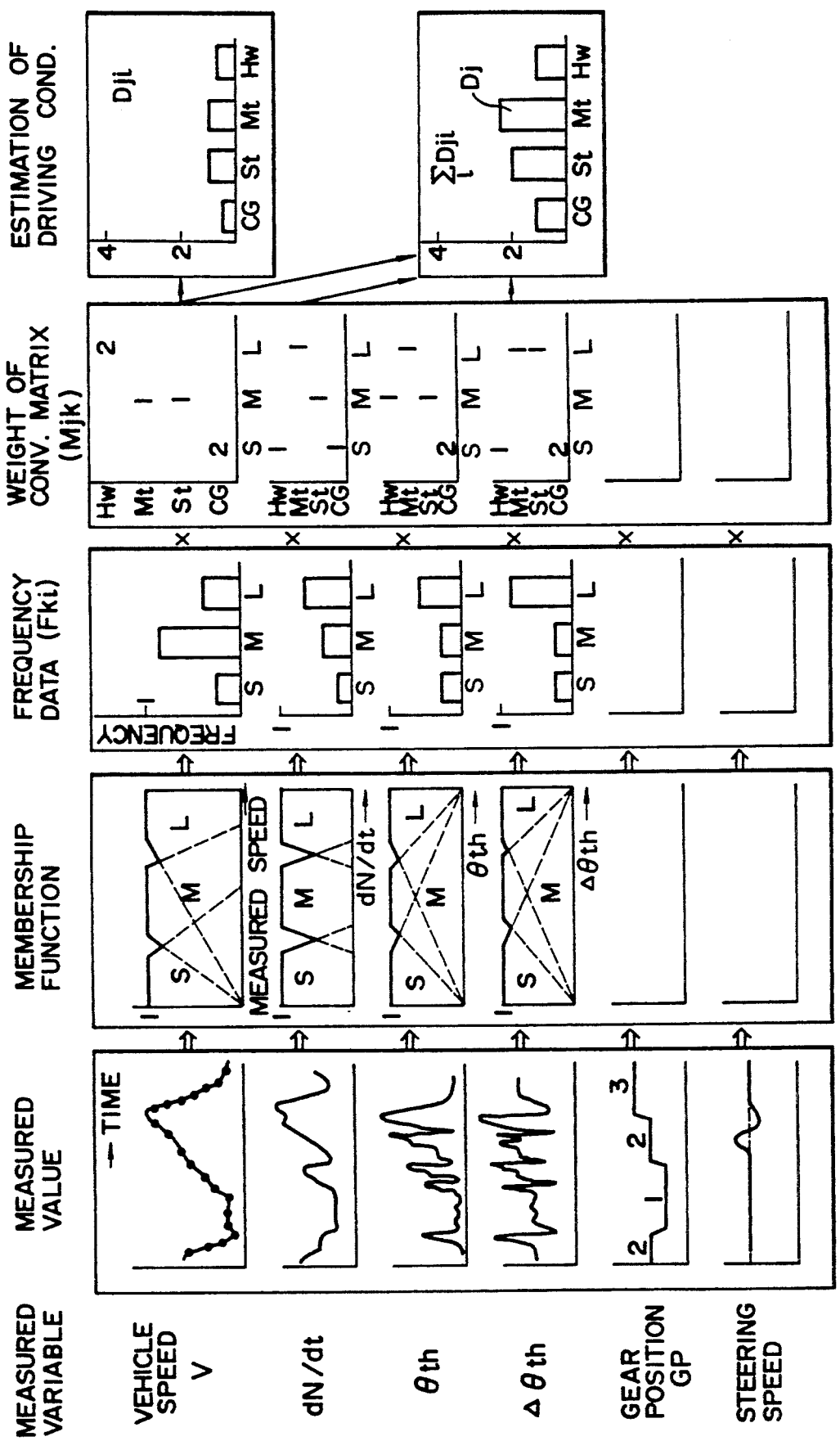

ELECTRONIC ENGINE CONTROL APPARATUS

This application is a continuation application of U.S. Ser. No. 07/233,209, filed Aug. 17, 1988 (now abandoned), which is a continuation-in-part application of U.S. Ser. No. 07/046,338, filed May 6, 1987 (now U.S. Pat. No. 4,853,720).

BACKGROUND OF THE INVENTION

The present invention relates to an electronic engine control apparatus, and more particularly to an electronic engine control apparatus whereby the driving characteristics of a vehicle are adjusted so as to match a driver's intent of how to drive the vehicle. Namely, the driving characteristics are adjusted in accordance with a driving environment of a vehicle and/or a driver's preference to the way he or she drives the vehicle.

Conventional engine control electronic apparatus of commercial vehicles have the engine control characteristics adjusted to match the driving characteristics which are most preferred by vehicle users (drivers and fellow persons) under the driving (running) environments most frequently encountered. A so-called greatest common divisor type matching has been adopted for the engine control characteristics. The term "matching" herein means adjusting an engine control unit so as to meet the requirements of a vehicle driver.

In a known engine control apparatus for electronically controlling a throttle valve, a method of electronically controlling the sensitivity of opening a throttle valve relative to an amount of accelerator pedal depression in accordance with the accelerator pedal depression amount and speed is adopted. This method is disclosed in U.S. Pat. No. 4,597,049.

For the conventional electronic engine control, however, a method has been adopted whereby the control is conducted based on the engine conditions during several engine strokes. In other words, the main function of such engine control is to control the engine in accordance with the measured results obtained for a short period. Thus, the engine control apparatus is not equipped with a unit for discriminating driving environments and drivers preferences in accordance with the measured results obtained for a long period of several tens to hundreds engine strokes. Such a long measuring period for discrimination is herein defined as an evaluation period.

The above-mentioned greatest common divisor type matching does not meet all driving environments and various driver's preferences (feelings). Also, the above-mentioned method whereby a change in the sensitivity of opening a throttle valve relative to an amount of acceleration pedal depression, as is the case of the above-described U.S. Patent, poses a problem when a sensitivity change occurs because of racing or double clutching.

SUMMARY OF THE INVENTION

It is an object of the present invention to satisfy vehicle users concerned with driveability and provide an engine control apparatus which is arranged to adjust or change the driving characteristics in accordance with the driver's intent of how to drive a vehicle, i.e., in accordance with the driving environment and/or driver's preference.

The above object can be achieved by 1.) measuring the driver action for a predetermined period with the aid of a computer built in the engine control apparatus, 2.) discriminating and categorizing the driving environments and/or the driver's preferences based on the measured results, and 3.) causing the engine control characteristics to match the driving environments and/or the driver's preferences in accordance with the categorized results. To this end, the driving conditions and the driver's action are measured a plurality of times for a period longer than several cycles, and the measured results are calculated and processed.

Generally, a vehicle is driven by a driver in accordance with the driver's intent of how to drive it under a given driving environment. The driver's preference being included in such an intent. On the other hand, the driving conditions of a vehicle reflect the driving environment and driver's preference. In consideration of these points, according to the present invention, the category of environments and preferences under different driving conditions is identified to determine the control parameters in conformity with the identified category. The measuring variables for discriminating the driver's intent, i.e., driving environments (i.e., running environments) and/or driver's preferences, include accelerator pedal position (angle) and depression speed, vehicle velocity, engine speed (revolutions of engine per unit time), acceleration rate, gear position (manual transmission (MT) vehicle), shift operation, steering speed, break occurrence frequency and the like.

Included in these measuring variables are the preferences of a driver as to how to drive the vehicle in a given driving environment.

The qualitative and empirical analysis on the influence of driving environments and driver's preferences upon the measuring parameters presented the results as shown in FIGS. 1A and 1B. The "driving conditions" are herein used to define the state where a driver drives a vehicle in a given driving environment in accordance with his or her preference.

Therefore, the driving conditions represent the driving environment, the driver's preference, or the combination thereof as the case may be. Thus, as the candidates for the driving condition variables to be described later, variables representative of the driving environments and variables representative of the driver's preferences are used.

According to the present invention, in order to categorize the driving conditions in accordance with the analyzed results, membership functions of the Fuzzy theory for example are used with respect to the measuring variables. A membership function which is used in the Fuzzy theory expresses the degree of participation of an element (variable) to a concept by a numeral value of 0 to 1.

Each of the measured variables during a predetermined period (evaluation period) is classified into three types, large, middle or small by using membership functions. The occurrence frequencies of respective types are also counted. With this method, the driving conditions and the driver actions during the evaluation period can be statistically recognized. The results give basic data. The data is the basis for discriminating the driving conditions.

The occurrence frequency of each measuring variable is converted into a driving condition through conversion matrix calculation so that the occurrence probability of each driving condition can be obtained. If the maximum occurrence probability of a driving condition exceeds a standard level, this maximum occurrence probability can be used as an estimated value of the driving condition during the evaluation period.

The conversion matrix values for calculating the driving condition from the occurrence frequency data are pre-set in accordance with the occurrence probabilities of each driving condition corresponding to the large, middle and small frequencies of each measuring variable. Like the conversion matrix values, occurrence probability values may be set to a value of 1 or 0 depending upon whether the measuring variable contributes to estimating the driving condition. Weighted values may be used for those measuring variables which contribute more to estimate the driving conditions than the other measuring variables or classification types.

Desired conversion matrix values enable the system to positively utilize the characteristics of respective measuring variables and discriminate the driving conditions. In addition, by adding the estimated value of a driving condition obtained for each measuring variable to a proper measuring variable, the driving condition can be discriminated more accurately.

After identifying a driving condition, a corresponding control method is selected to change engine control parameters. Ignition timings, amount of injected fuel and the like are chosen as the control parameters.

Apart from the above, according to the studied and categorized results, the driver's intents/preferences include three modes: (1) Sporty, (2) Normal and (3) Gentle. There is a tendency that where a vehicle matched to the average preference is used, a driver with "Sporty" preference more abruptly depresses the accelerator pedal and brake pedal than a driver with "Normal" preference, and a driver with "Gentle" preference does so more gently than a driver with "Normal preference.

Such tendency is not always present, but may change with the road conditions and the fellow persons. Even if the driver's intent/preference are expressed indefinitely for a time, by time sequentially measuring and evaluating the motions of accelerator pedal and brake pedal it become possible to categorize the driver's intent into one of the above-mentioned three modes. In particular, the motions of both the accelerator and brake pedals are continuously measured at the start, acceleration, constant speed running, reduced speed and stop, and other conditions, and the measured results are categorized using membership functions.

According to the categorized results, the sensitivity of depressing an accelerator pedal for example is made high for a driver with "Sporty" preference, and is lowered for a driver with "Gentle" preference.

The engine characteristics are controlled in accordance with the driving environments and/or the driver's preferences as described above so that comfortable driveability and riding comfort are assured as well as a vehicle matched to the driver's preference.

BRIEF DESCRIPTION OF THE DRAWINGS

FIGS. 1A and 1B show the relation between measuring variables and the driving environments and driver's preferences;

FIG. 2 schematically shows the structure of a typical example of an engine control apparatus according to the present invention;

FIG. 4 illustrates the concepts of the engine control process contents shown in FIG. 3;

DESCRIPTION OF THE PREFERRED EMBODIMENTS

Figure 3:
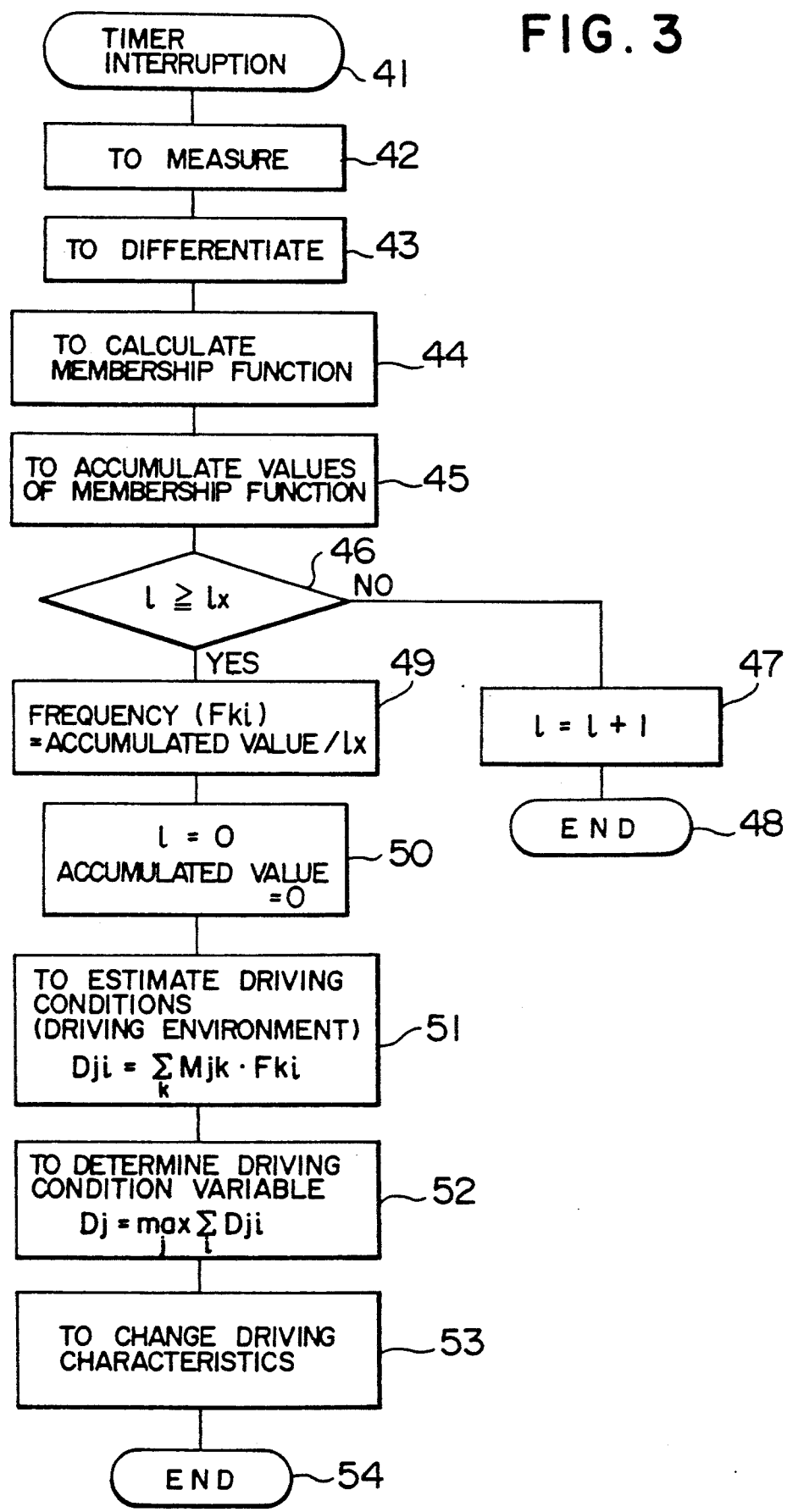
FIG. 3 is a flow chart for explaining the engine control operation according to a first embodiment of the present invention.
Figure 5A:
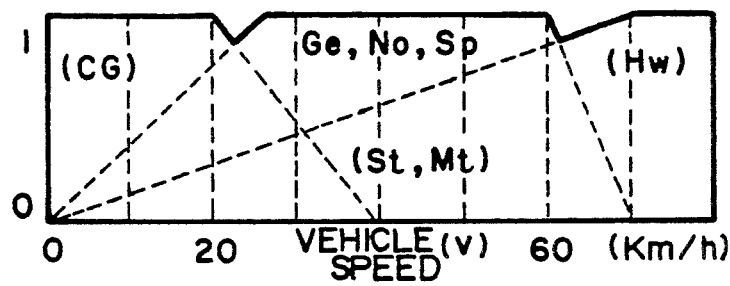
FIGS. 5A to 5F show examples of the membership functions shown in FIG. 4.
Figure 5B:
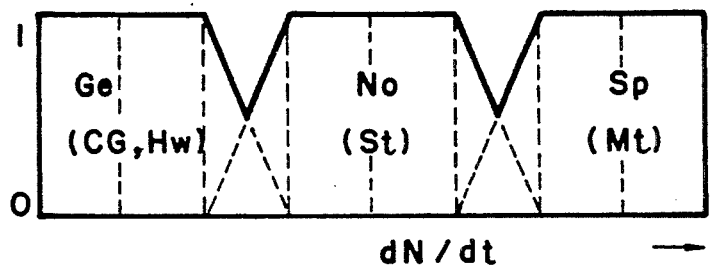
Figure 5C:
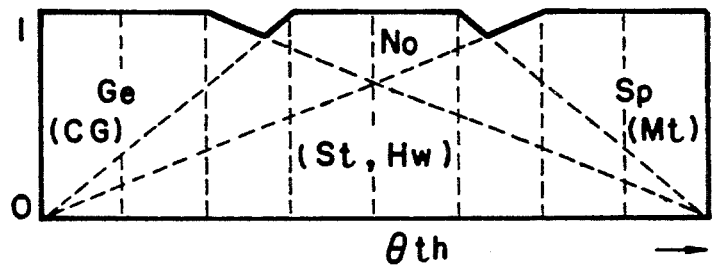
Figure 5D:
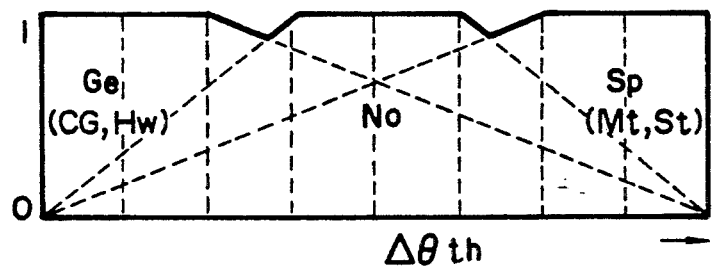
Figure 5E:
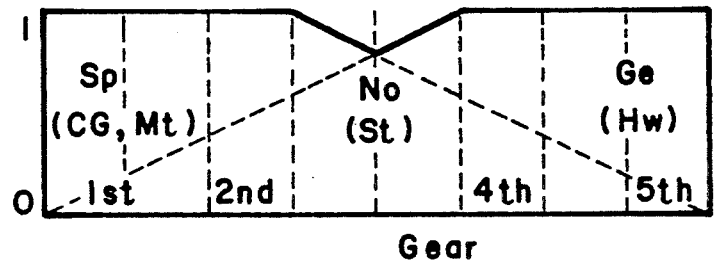
Figure 5F:
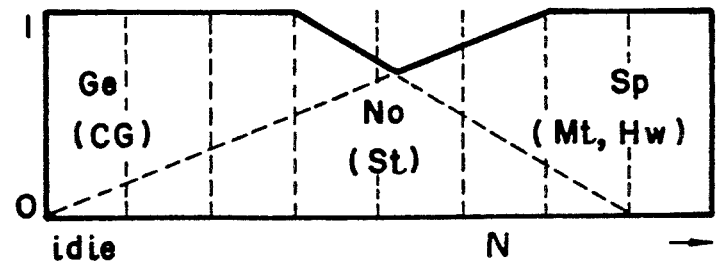

The embodiments of the electronic engine control apparatus according to the present invention will be described below with reference to the accompanying drawings.

FIG. 2 shows the structure of a typical example of the electronic engine control apparatus. In this embodiment, the driving environments are discriminated based on the measured values of each measuring variable using the structure shown in FIG. 2. The engine control parameter value is changed in accordance with the discrimination result.

In the figure, reference numeral 1 denotes an accelerator pedal, 2 a brake pedal, and 3 denotes a steering wheel. Reference numerals 4 and 5 denote rheostats whose sliding contacts move by the amounts corresponding to the depression amounts of the accelerator and brake pedals 1 and 2, respectively. An output voltage $\theta_{br}$ of the rheostat 5 represents the depression angle of the brake pedal, and an output voltage $\theta_{th}$ of the rheostat 4 represents the depression angle of the accelerator pedal, i.e., the opening angle of a throttle valve 7. Similarly, reference numeral 6 denotes a rheostat whose sliding contact moves by the amount corresponding to the rotary angle of the steering wheel which is represented by an output voltage $\theta_{st}$ of the rheostat 6. In the embodiment shown in FIG. 2, the throttle valve 7 which mechanically couples to the accelerator pedal 1 is used by way of example. Reference numeral 8 denotes a gear position detector which detects the gear position of a shift lever, the output signal Gp therefrom being representative of the gear position. Reference numeral 9 denotes an angular position sensor which is mounted facing a gear 34 interlocking with a crank shaft 32 and outputs a position signal Ps at a predetermined number of rotations of the gear, e.g., every one rotation. Reference numeral 12 denotes a vehicle speed sensor whose output signal v represents vehicle speed. Reference numeral 13 denotes an air flow meter which measures the air flow amount into an intake manifold. Reference numeral 14 denotes a fuel injection valve, and 15 an ignition plug. Reference numeral 10 denotes a control unit which processes inputted signals v, Ps, $\theta_{br}$, $\theta_{th}$, $\theta_{st}$, Gp and Qa and supplies control signals to the fuel injection valve 14 and the ignition plug 15. The control unit 10 includes an I/O circuit 20, a central processing unit (CPU) 22, a read-only memory (ROM) 24, a random access memory (RAM) 26, and amplifiers 28 and 30.

The measured values of each measuring variable are time sequentially processed by the control unit 10. The process contents differentiate representative measured values. The differentiated values of representative measuring variables are given by the following equations where t, t+1, t+2, ... are sample timings at the measurement.

$$\Delta\theta_{th}(t) = \theta_{th}(t+1) - \theta_{th}(t)$$

$$\Delta\theta_{st}(t) = \theta_{st}(t+1) - \theta_{st}(t)$$

$$\Delta v(t) = v(t+1) - v(t)$$

$$\Delta N(t) = N(t+1) - N(t)$$

where N represents an engine speed (revolutions of engine per unit time) which is given, e.g., by the number of inputted signals Ps's during a unit time.

The control unit 10 causes the measured values, including the differentiated values, to be processed with membership functions of the Fuzzy theory so that the occurrence frequencies of each measuring variable are obtained. The driving environment is estimated by subjecting the occurrence frequencies to the conversion matrix. Then, the control parameters, changed in accordance with the estimated value of the driving environment are obtained. The fuel injection amount and the spark timings by way of example are adjusted in accordance with the changed control parameters.

The engine control operation of the control unit 10 will be described with reference to the flow chart of FIG. 3. FIG. 4 shows the engine control concepts. FIGS. 5A to 5F shows examples of membership functions.

The membership functions shown in FIGS. 5A to 5F are the examples for the membership functions shown in FIG. 4, obtained using a certain type of a vehicle.

For example, by categorizing the driving environments into a congested road, an urban street, a suburban road, a mountain road, and a highway, the respective running features can be grasped.

The feature of each driving environment will be described below which is shown in FIGS. 1A and 1B, and FIGS. 5A to 5F.

Generally, the vehicle speed v is high and gear position is changed rarely during a highway running. Therefore, if the vehicle speed is high and a top gear is used with a low frequency of a shift operation, it can be discriminated as a highway running.

Generally, a forward operation and a stop operation are repeated on a congested road. Therefore, the vehicle speed is low, the rate of change dN/dt of the engine speed N and $\Delta\theta_{th}$ are small, and the brake operation frequency is high.

There are less junctions on a suburban road than on an urban street so a vehicle generally runs near a limited speed. Therefore, if the vehicle speed maintains a limited speed and the frequency and range of steering operation is small, it can be discriminated as a suburban road running.

There are many junctions on an urban street. Therefore, the operation frequency of both the brake pedal and steering wheel is high. The vehicle speed v and acceleration rate $\Delta N$ (=dN/dt) take middle values.

There are many curves on a mountain road so acceleration and deceleration are repeated and the steering wheel is frequently operated. Therefore, in general, if $\Delta\theta_{th}$ and dN/dt are large, if the frequency of change in depressing the brake and accelerator pedals is high, and if the frequency of operating the steering wheel is high, it can be discriminated as a mountain road running.

In this embodiment, for example, if the vehicle speed v is high, it is discriminated as a highway running. If the vehicle speed v is low and the change rate dN/dt of the engine speed is small, it is discriminated as a congested road running. If both $\Delta\theta_{th}$ and dN/dt are large, it is discriminated as a mountain road running.

The difference between the running conditions on a suburban road and an urban street is small so the discrimination therebetween is less significant. Therefore, in this embodiment, only the urban street is to be discriminated. The urban street running is discriminated if the vehicle speed v and acceleration rate $\Delta N$ take middle values.

The suburban road and the urban street may be categorized and discriminated dependent upon the environments and countries where a vehicle is used. It is not necessary to discriminate the mountain road running in the district where there is no mountain. Categorization of driving environments and measuring variables for such categorization are properly selected dependent upon a particular environment where a vehicle is used.

In this embodiment, it is therefore assumed that the driving environments are categorized into the above-mentioned four types and discriminated based on, the vehicle speed v, engine speed change rate (acceleration rate) dN/dt, and throttle opening degree change rate $\Delta\theta_{th}$ among various measuring variables. Thus, the membership functions and the like for the gear position and steering speed are omitted in FIG. 4. FIG. 4 illustrates the functions performed by blocks 44 to 52 which will be described below.

The program shown in FIG. 3 starts upon a timer interruption at block 41. The measuring variables representative of the driving environments and the driver's preference are measured by various sensors at block 42. Measured signals Ps, v and $\theta_{th}$ are inputted to the I/O circuit 20. The engine speed N is calculated using Ps. The measuring variables whose change with time is requested to be obtained, (i.e., N and $\theta_{th}$) are subjected to differentiation at block 43 to obtain the differentiated values (i.e., $\Delta N$ (=dN/dt) and $\Delta\theta_{th}$). The time-sequential values v, $\Delta N$ and $\Delta\theta_{th}$ are categorized for each measuring variable, preferably into large (L), middle (M) or small (S) groups, by using the membership functions (FIG. 4, FIGS. 5A, 5B and 5D) at block 44. The probability of categorization of each measured value into a particular group is given by a membership function value.

The membership function values at each timer interruption are accumulated for each measuring variable at block 45.

At block 46, the number l of timer interruptions is compared with a predetermined number lx to check if the former becomes equal to the latter or not.

The timer interruption period multiplied by lx is the period for evaluating the driving environments. If the timer interruption number l is smaller than lx, the value l is incremented by 1 at block 47 to follow block 48.

If the timer interruption number l becomes lx, the accumulated value of membership function values for each measuring variable is divided by lx at block 49 to obtain occurrence frequencies Fki of each of the large, middle and small groups (k) for each measuring variable (i).

At block 50, the timer interruption number l and the accumulated values are initialized.

The following equation (1) is used to perform matrix calculation for estimating the driving environment at block 51.

$$Dji = \sum_k Mjk \cdot Fki \tag{1}$$

where
- Fki = occurrence frequency of a measuring variable;
- Mjk = conversion matrix for conversion from occurrence frequency to driving condition: weight for selecting driving condition;
- Dji = value indicating a possibility of each driving condition (environment) (j);
- i = number of measuring variable: vehicle speed (v), dN/dt, $\theta_{th}$, $\Delta\theta_{th}$, Gear, engine speed (n), etc.;
- j = number of driving condition (environment): congestion (CG), urban street (ST), mountain road (Mt), and highway (HW); and
- k = group number of measured value: small (S), middle (M) and large (L).

The measuring variables i are dN/dt and $\Delta\theta_{th}$ in this embodiment.

The driving environment is determined during the evaluation period as in the following. The values of Dji for necessary measuring variables (i) are added together. Namely, the values of Dji for v, dN/dt and $\Delta\theta_{th}$ are added together to obtain $$\sum_i Dji$$

for each environment. The driving environment is determined as the driving condition (j) which takes a largest value among the added results Dji. The maximum value Dj is given by the following equation (2).

$$Dj = \max_j \sum_i Dji \tag{2}$$

The value Dj is called as a driving condition variable. In particular, in the example shown in FIG. 4, the value of $$\sum_i Dji$$

for Mt environment is the largest among the calculated values $$\sum_i Dji$$

for CG, St, Mt, and Hw so that the value Dj is determined as the driving condition variable for the mountain road environment (Mt). Thus, the driving condition is discriminated as the mountain road (Mt). In this case, the value Dj may be determined as the driving condition variable on condition that it exceeds a predetermined value, e.g., 2.0.

The driving characteristics are changed in accordance with the determined driving condition variable Dj at block 53.

In the example shown in FIG. 4, the values of Dji obtained only from the vehicle speed v and the values of Dji obtained from the vehicle speed v, the engine speed change rate dN/dt and the throttle valve opening degree change rate $\Delta\theta_{th}$ are shown for the comparison sake. The latter values are shown more effective for determining the value Dj.

In order to change the driving characteristics, the following known elementary technology may be utilized. In the case where the accelerator pedal and the throttle valve are directly coupled via a linkage mechanism, a method of changing a depression repulsion force of the accelerator pedal, a method of changing an air fuel ratio (A/F) by changing the coefficient (e.g., $k_M$) of the equation $Ti = k_M \cdot kQ_a/N$ for calculating the injected fuel amount, and a method of changing the ignition or spark timings are utilized. In the case where a vehicle adopting an electronic throttle is used, a method of changing the transmission characteristic from the accelerator pedal to the throttle valve (as disclosed, e.g., in U.S. Pat. No. 4,597,049), a method of servo-controlling so as to obtain a desired acceleration rate pattern of a vehicle which has been obtained based on the motion of the accelerator pedal are utilized. For an A/T vehicle, a method of changing the characteristic of a torque converter is utilized.

In this embodiment, the method of changing the ignition timings was chosen to give the following description of changing the driving characteristics.

The ignition or spark timings $\theta_{ad}$ are determined by the following equation (3) at block 53.

$$\theta_{ad} = f(Dj, Dj\text{max}, \theta_{ad}) \tag{3}$$

The spark timing $\theta_{ad}$ at the maximum torque is determined by the above equation based on a deviation of the value Dj from a value Djmax which is a value Dj corresponding to the spark timing $\theta_{ad}$ at the maximum torque. In the case where the range of changing the spark timings can be narrowed, the following equation (4) is used as an approximate equation.

$$\theta_{ad} = \frac{Dj}{Dj\text{max}} \theta_{ad} \tag{4}$$

In accordance with the thus obtained $\theta_{ad}$, the spark timings are controlled. The $\theta_{ad}$ may be obtained by the equation (4). Otherwise, the values of $\theta_{ad}$ corresponding to the values Dj may be read from the predetermined map stored in the ROM 24.

In general, the spark timings on a congested road, urban street, mountain road and highway are advanced further relative to each other in this order.

The program shown in FIG. 3 terminates at block 54 and waits for a next timer interruption.

The spark timings have been calculated based on the values Dj at block 53. However, the spark timings may be determined in accordance with the type of a driving condition variable determined at block 52, i.e., in accordance with the determined driving environment among CG, St, Mt, and Hw environments. In particular, spark timings near ordinary spark timings are used in case of St and Mt environments, late spark timings are used in case of CG environment, and advanced spark timings are used in case of Hw environment. The values of spark timings for each driving environment may be stored, e.g. in a ROM in the form of map to read therefrom the spark timings corresponding to the determined environment.

Other examples of a method of changing the driving characteristics will be described below.

First, a method of changing an air fuel ratio (A/F) by changing, in accordance with the determined driving environment, the coefficient (e.g., $k_M$) of the equation for calculating the injected fuel amount will be described.

During the injected fuel amount calculation, the opening time Ti of the injector 14 is obtained by the following equation (5) using a sucked air amount Qa measured by the air flow meter 13 and the engine speed N.

$$Ti = k_M \cdot k \cdot Qa/N \qquad (5)$$

where k is a conversion coefficient, $k_M$ is a coefficient for a determined driving environment which takes the following values by way of example.

highway running ... $k_M = 1.1$
mountain road running ... $k_M = 1.05$
urban street running ... $k_M = 1.0$
congested road running ... $k_M = 0.9$ Next, a method of changing a depression repulsion force of a accelerator pedal in accordance with the determined driving environment will be described for the case where the accelerator pedal and the throttle valve are coupled via a linkage mechanism.

Figure 6:
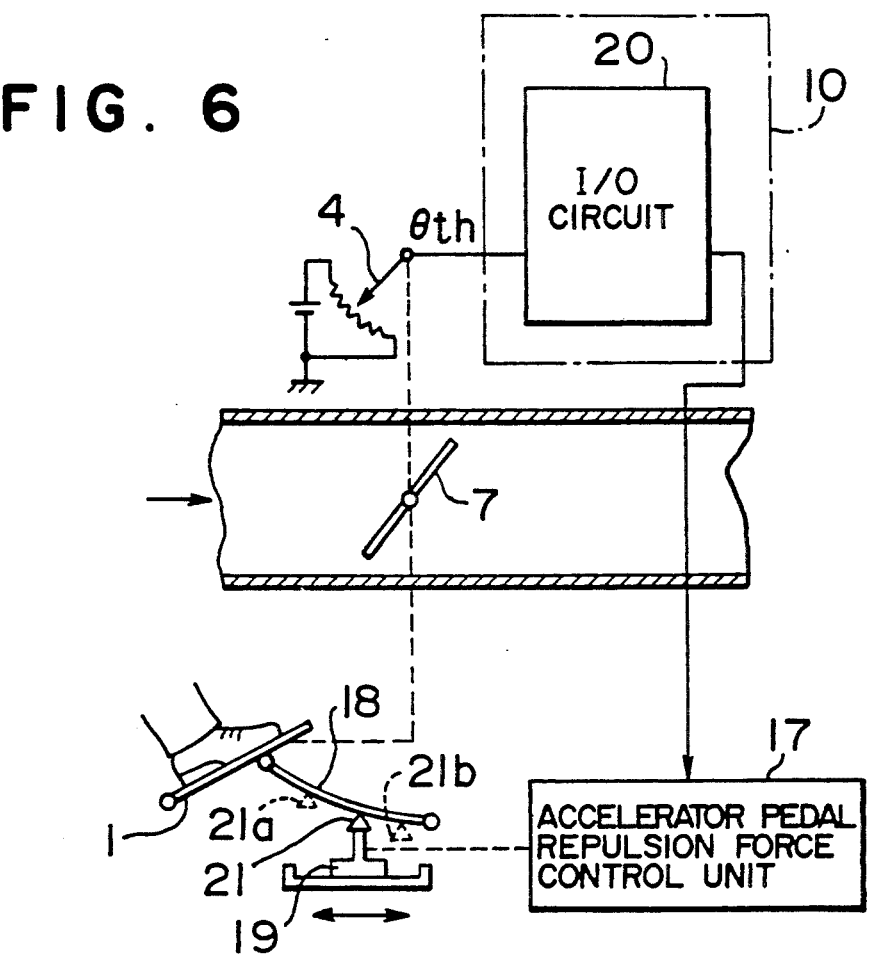
FIG. 6 shows an example of a control mechanism for controlling the depression repulsion force of an accelerator pedal.

FIG. 6 shows an example of a depression repulsion force controlling mechanism for an accelerator pedal which is directly coupled to the throttle valve. In the figure, the depression repulsion force of the accelerator pedal 1 is controlled such that the fulcrum 21 of a plate spring 18 for returning the accelerator pedal 1 is moved by a fulcrum movement mechanism 19 which is actuated by an accelerator pedal repulsion force control unit 17.

The control unit 17 is responsive to a signal from the I/O circuit 20 representative of the discriminated driving environment and changes the position of the mechanism 19. The control unit 17 may use a stepping motor. The fulcrum 21 is moved to a position 21a in the case of a congested road to increase the repulsion force. It is moved to a position 21b in the case of a highway road to reduce the repulsion force. In the case of an urban street and a mountain road, the fulcrum 21 is moved to an intermediate position between the positions 21a and 21b.

In this embodiment, any one of the control parameters, including the spark timings, injected fuel amount, accelerator pedal repulsion force and etc. may be adjusted, or alternatively a plurality of control parameters may be adjusted at a time.

The second embodiment of the present invention will now be described.

In this embodiment, the driver's preferences are discriminated based on the measured values of each measuring variable using the structure shown in FIG. 2, and the engine control parameter value is changed in accordance with the discrimination result.

The control unit 10 causes the measured values including the differentiated values to be processed with membership functions of the Fuzzy theory so that the occurrence frequencies of each measuring variable are obtained and the driver's preference is estimated by subjecting the occurrence frequencies to the conversion matrix. Then, the control parameters changed in accordance with the estimated value of the driver's preference are obtained. The fuel injection amount and the spark timings are calculated in accordance with the changed control parameters.

Figure 7:
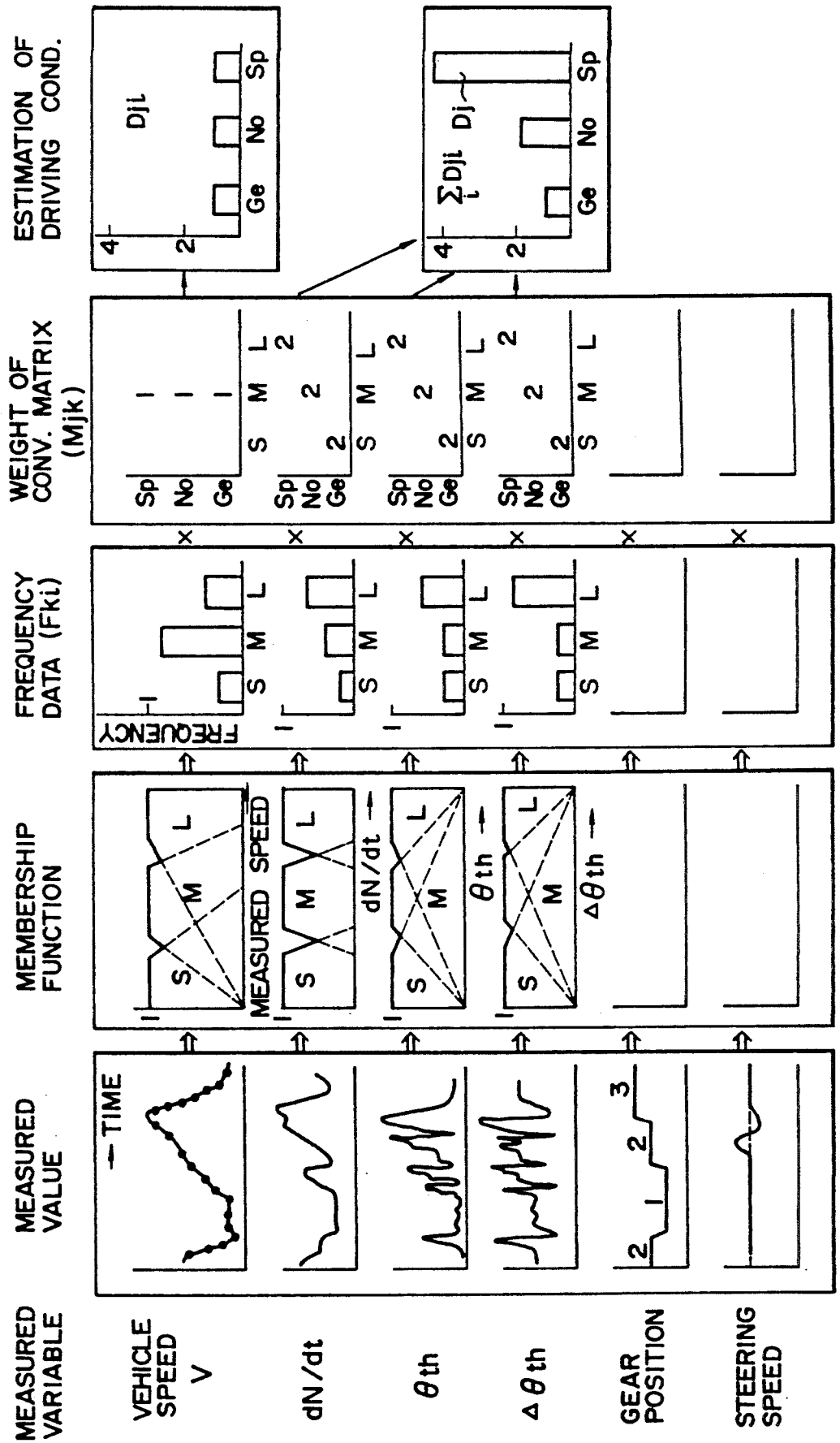
FIG. 7 illustrates the concepts of the engine control process contents according to a second embodiment of the invention.

The engine control operation by the control unit 10 will be described with reference to the flow chart of FIG. 3. FIG. 7 shows the engine control concepts. FIGS. 5A to 5F show examples of membership functions.

The membership functions shown in FIGS. 5A to 5F are the examples for the membership functions shown in FIG. 4, which have been obtained using a certain type of a vehicle.

For example, the driver's preferences can be categorized into "Sporty (Sp)", "Gentle (Ge)" and "Normal (No)".

The feature of each driver's preference will be described below which is shown in FIGS. 1A and 1B, and FIGS. 5A to 5F.

Generally, there is a tendency that where a vehicle matched to the average preference is used, a driver with "Sporty" preference more abruptly depresses the accelerator pedal and brake pedal than a driver with "Normal" preference, and a driver with "Gentle" preference more gently depresses them. Therefore, with a large $\Delta\theta_{th}$, the preference is discriminated as "Sporty". If $\Delta\theta_{th}$ is small, it is discriminated as "Gentle".

Also, if the frequency of "large (L)" of dN/dt (or $\Delta$ N) is low, the preference is discriminated as "Sporty". If the frequency of "small (S)" is high, the preference is discriminated as "Gentle".

Therefore, in this embodiment, the preference is discriminated as "Sporty" if the values $\theta_{th}$, $\Delta\theta_{th}$ and dN/dt are large, as "Gentle" if they are small, and as "Normal" if they are middle.

In this embodiment, it is assumed that the driver's preferences are categorized into three types and discriminated based on the throttle opening degree $\theta_{th}$, throttle opening degree change rate $\Delta\theta_{th}$ and engine acceleration rate $\Delta$ N (dN/dt). Thus, the membership functions and the like for the gear position and steering speed are omitted in FIG. 4.

The driving condition is estimated in accordance with the flow chart shown in FIG. 3 using the values $\theta_{th}$, $\Delta\theta_{th}$ and dN/dt as the measuring variables, in a similar manner to the first embodiment.

The driving condition, i.e., driver's preference can be obtained at block 51 using the equation (1), where Dji = value indicating a possibility of each driving condition (preference) (j), i = number of measuring variable: $\theta_{th}$, $\Delta\theta_{th}$, dN/dt, j=number of driving condition (preference): Sporty (SP), Normal (No), and Gentle (Ge).

The driver's preference is determined during the evaluation period. The values of Dji for necessary measuring variables (i) are added together. Namely, the values of Dji for dN/dt, $\theta_{th}$ and $\Delta\theta_{th}$ are added together to obtain $$\sum_i Dji$$

for each preference. The driver's preference is determined as the driving condition (j) which takes a largest value among the added results Dji.

In particular, in the example shown in FIG. 7, the value of $$\sum_i Dji$$

for Sp preference is the largest among the calculated values $$\sum_i Dji$$

for Sp, Ge and No so that the value Dj is determined as the driving condition variable for the Sporty preference. Thus, the driver's preference is discriminated as the "Sporty (Sp)".

The driving characteristics are changed in accordance with the determined driving condition variable Dj at block 53, in a similar manner to the first embodiment. The spark timings may be determined from the equation (4) using the determined Dj.

The spark timings may be determined in accordance with the type of a driving condition variable determined at block 52, i.e., in accordance with the determined driver's preference among Sp, No and Ge preferences. In particular, spark timings near the ordinary spark timings are used in case of No preference, late spark timings are used in case of Ge preference, advanced spark timings are used in case of Sp preference, to thereby enable a maximum allowable torque of the engine.

If the injected fuel amount is controlled in accordance with a driver's preference, the coefficient $k_M$ of the equation (5) is set as in the following by way of example.
   Sporty preference ... $k_M$=1.1
   Normal preference ... $k_M$=1.0
   Gentle preference ... $k_M$=0.9

If the depression repulsion force adjustment mechanism for the accelerator pedal 1 shown in FIG. 6 is used, the fulcrum 21 is moved to 21a in the case of Ge preference to increase the repulsion force, and it is moved to 21b in the case of Sp preference to reduce the repulsion force. In the case of No preference, the fulcrum 21 is moved to an intermediate position between the positions 21a and 21b.

Figure 8:
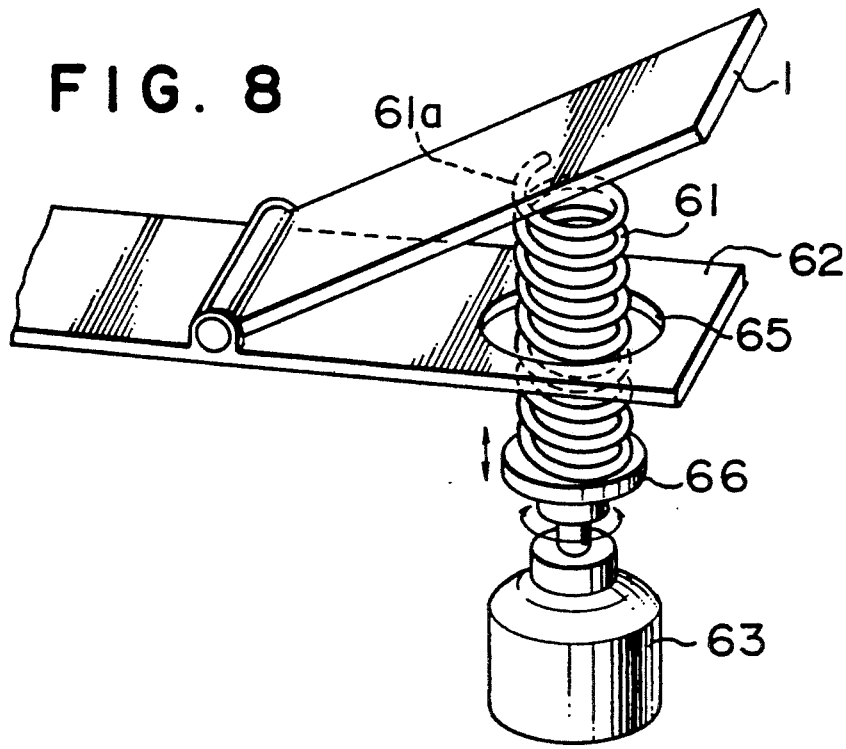
FIG. 8 shows another example of a control mechanism for controlling the depression repulsion force of an accelerator pedal.

A substitute for the depression repulsion force adjustment mechanism for the accelerator pedal 1 is shown in FIG. 8. In FIG. 8, the repulsion force for the accelerator pedal 1 is stepwise adjustable by stepwise changing the length of a force applying spring 61 between a support plate 62 and its top end 61a through up/down movement of a saucer 66 by a pulse motor 63. Reference numeral 65 denotes a hole formed in the plate 62 for allowing the spring 61 to pass therethrough. The motor 63 is rotated by a predetermined number of revolutions in response to a signal representative of the "preference" outputted from the I/O circuit 20.

Alternately, a link mechanism may be in the middle of a wire which couples the accelerator pedal and the throttle valve. The length of the link is adjusted in the similar manner as above to realize the adjustable repulsion force.

Figure 9:
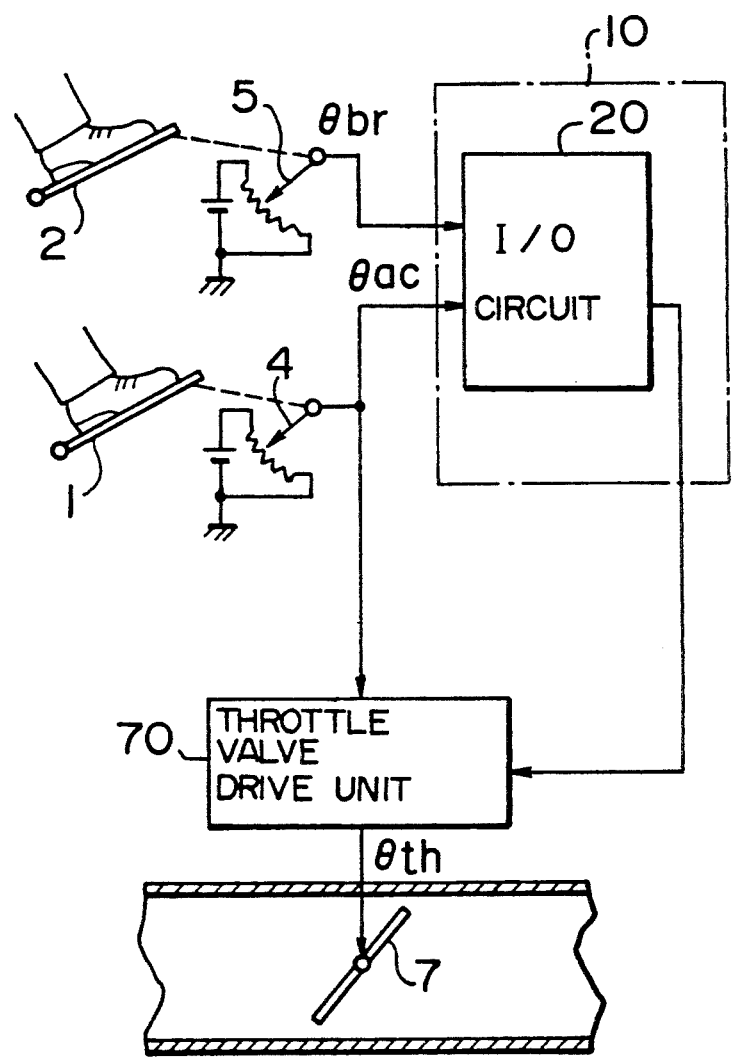
FIG. 9 illustrates a case where the present invention is applied to an electronic throttle valve.

An example of a throttle valve control is shown in FIG. 9 wherein an accelerator pedal 1 and a throttle valve 7 are electrically interconnected. As shown in FIG. 9, the response characteristic of a throttle valve drive unit 70 for converting an accelerator pedal angle $\theta_{ac}$ into a throttle valve angle $\theta_{th}$ is changed with the discrimination result of "preference" from the control unit. The response characteristic is made adjustable by choosing the transfer function as a first order delay and changing the time constant thereof. The characteristic can be expressed by the following transfer equation (6).

$$G(S) = \frac{\theta_{th}}{\theta_{ac}} = \frac{1}{1 + TS} \quad (6)$$

where T represents a time constant. Assuming that T1<T2<T3, the time constants for respective discrimination results of preferences are set as in the following.
   Sporty preference ... T=T1
   Normal preference ... T=T2
   Gentle preference ... T=T3

As a method of controlling the throttle valve angle $\theta_{th}$ with the throttle valve being driven electrically, there is also a method known whereby a target acceleration rate is given instead of a first order delay to control the throttle valve angle $\theta_{th}$ to follow the target acceleration rate. Such a method is disclosed in U.S. Pat. No. 55,530 titled "SYSTEM AND METHOD FOR ELECTRONIC CONTROL OF INTERNAL COMBUSTION ENGINE" filed on May 29, 1987 by the same assignee as the present application.

Figure 10A:
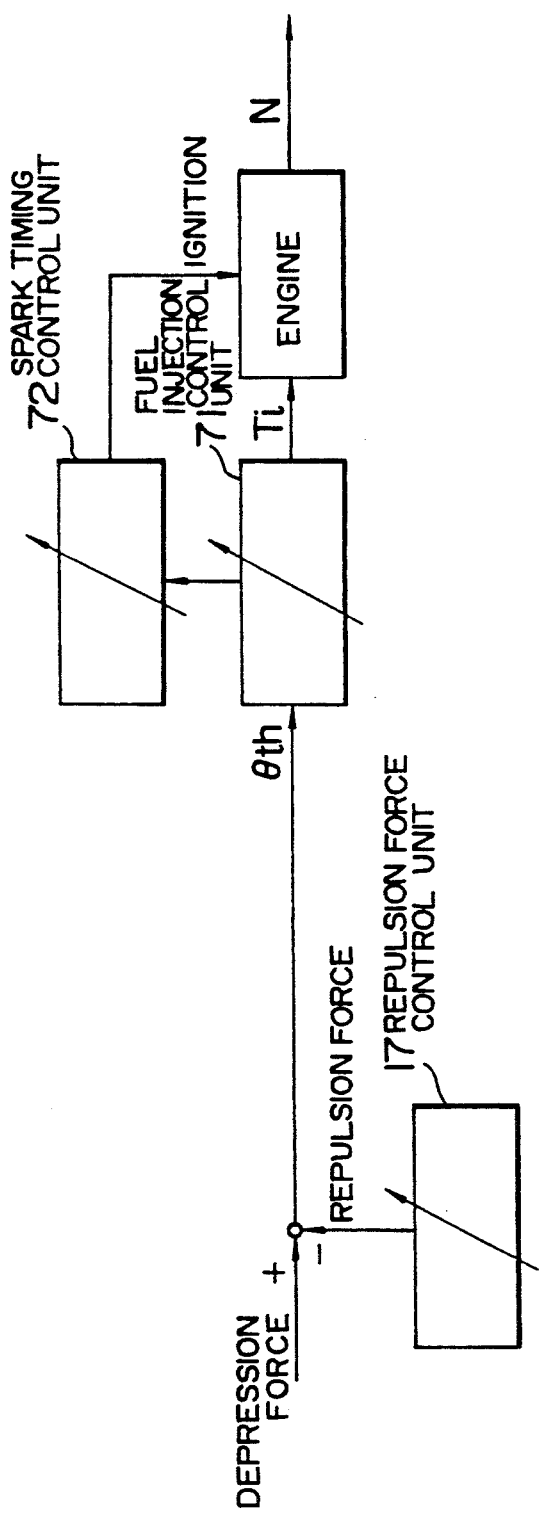
FIGS. 10A and 10B are functional block diagrams illustrating the controls made with respect to FIGS. 6 and 8 and FIG. 9, respectively.
Figure 10B:
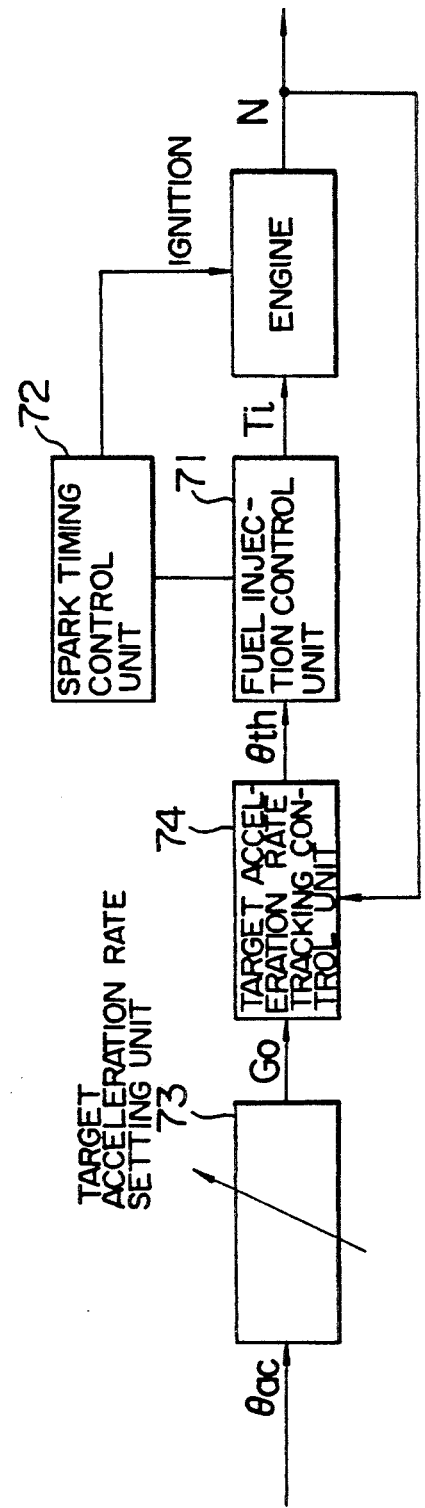

Two particular arrangements have been described utilizing the method of changing the driving characteristics by using an accelerator pedal. In one method, the repulsion force is changed with a preference where the accelerator pedal and the throttle valve are directly coupled. In the other method, $\theta_{th}$ is controlled to follow a target acceleration assigned to a preference where an electric or electronic circuit is interposed therebetween. The functional block diagrams for both the methods are shown in FIGS. 10A and 10B. The blocks with an arrow are used in adjusting the driving characteristics of a vehicle to a driver's preference. In the case shown in FIG. 10A, where an accelerator pedal and a throttle valve are directly coupled, any one of three adjustment parameters is adjusted in accordance with a driver's preference. The three parameters includes the stiffness of the spring in the repulsion force control unit 17, an air/fuel ratio by a fuel injection control unit 71, and spark timings by a spark timing control unit 72. The functions of the spark timing control unit 72 and the fuel injection control unit 71 are adjusted in accordance with a driver's preference.

In the case shown in FIG. 10B, a target acceleration rate dN/dt is set by a target acceleration rate setting unit 73 in accordance with $\theta_{ac}$ and a preference. A target acceleration rate tracking control unit 74 controls the throttle opening degree $\theta_{th}$ in accordance with a deviation between the target acceleration rate G0 and an actual vehicle acceleration rate detected value G. The functions of the units 73 and 74 are allotted to the control unit 10. The acceleration rate detected value G can be obtained from a differentiated value $\Delta N$ of engine speed N and a gear ratio.

A preference to a particular driveability can be recognized to some extent by using only the accelerator pedal. However, since the driver action may include abnormal neutral gear operation such as racing and double clutching, the accuracy of discrimination may be degraded if only with the accelerator pedal is used as a variable. In view of this, since a driver with "Sporty" preference often performs abrupt acceleration and deceleration, discrimination of a preference may be made with high accuracy based on the degree of changes in position and speed of both the accelerator and brake pedals. Discrimination of a preference may be made with further accuracy by considering the occurrence frequencies of "large/small" measured values of the vehicle speed, engine speed and gear position.

It becomes sometimes necessary to abruptly accelerate a vehicle during driving in order to avoid obstacles. If a driver with "Gentle" preference to driveability abruptly depresses the accelerator pedal, the preference is changed to "Sporty". In this case, a change to "Sporty" may be indicated to the driver by a lamp or a sound. In particular, a buzzer or a lamp may be connected to an output terminal of the I/O circuit 20 to inform the driver of a change of preference.

Examples shown in FIGS. 8, 9 and 10B are applicable to the first embodiment.

Next, the third embodiment of the present invention will be described.

If driving characteristics are adopted through discrimination using either the driving environment or the driver's preference, it suffices to adopt one of the methods as described with the first and second embodiments. However, there are cases where the engine cannot be effectively controlled the driving environments or the driver's preferences are independently used in discriminating them.

For example, during a congested road running and highway running, the driving condition is influenced more by the driving environment but influenced less by the driver's preference, whereas in an urban street running and mountain road running, the driving condition is more influenced by the driver's preference.

In consideration of the above points, in this embodiment, the driving condition variables are categorized into five classes, i.e., (1) Congestion (CG), (2) Gentle (Ge), (3) Normal (No), (4) Sporty (Sp), and (5) Highway (Hw).

In this embodiment, the measured values of each measuring variable are used with the structure shown in FIG. 2 in discriminating the driving condition as one of the above five classes. The engine control parameter value is changed in accordance with the discrimination result.

The following features have been confirmed for the case where the driving environments are categorized into a congested road, a suburban road, an urban street, a mountain road, and a highway.

Generally, the vehicle speed is high and the gear is changed rarely during a highway running. Therefore, if the vehicle speed is high, and a top gear is used with high occurrence frequency of a small number of gear shifts, then it can be considered a highway running. During the highway running, the driver's preference is not predominant so the spark timings are generally advanced to obtain an allowable maximum torque. However, in a certain type of vehicles, the spark timings may be delayed in accordance with a driver's preference to match "Normal" or "Gentle" preference.

Generally, a forward operation and a stop operation are repeated on a congested road. Therefore, the vehicle speed is low and the brake operation frequency is high. In this case, the driver's preference is not predominant so a gentle acceleration is generally desirable. Thus, the spark timings are delayed. The spark timings may be adjusted to those at "Gentle" preference of driveability.

There are less junctions on a suburban road than on an urban street so a vehicle generally runs near a limited speed and the frequency and range of steering operation is small. In this case, the spark timings are not newly adjusted so the spark timings prior to the present discrimination may be maintained. The reason for this is that it is desirable to have an engine speed near the allowable maximum torque during the constant speed running in view of exhausted gas and fuel consumption. Also, the driver's preference becomes predominant at transition conditions.

There come many junctions during running on an urban street. Therefore, the operation frequency of both the brake pedal and steering wheel is high. That the change between the accelerator pedal and the brake pedal is frequently performed means many transition conditions. So, in this case, the driver's preference becomes predominant. Accordingly, it is possible to discriminate both the driving environment and the driver's preference in an urban street running. If the frequency of "Large (L)" of dN/dt (or $\Delta$ N) is high, it can be discriminated as "Sporty". On the other hand, if the frequency of "Small (S)" is high, it can be discriminated as "Gentle".

There are many curves on a mountain road so acceleration and deceleration are repeated and the steering wheel is frequently operated. Thus, in the case where the frequency of change in depressing the brake and accelerator pedals is high and the frequency of operating the steering wheel is high, it can be discriminated as a mountain road running. Since acceleration and deceleration are often repeated on a mountain road, the driver's preference becomes predominant. Similar to the urban street running, "Sporty" and "Gentle" preferences are discriminated in accordance with the frequencies of "Large/Small" of dN/dt (or $\Delta$ N).

As above, in this embodiment, the congested road and highway runnings are discriminated to change the driving characteristics based on the discrimination results. For the remaining driving environments, the driver's preferences, i.e., "Sporty", "Normal" and "Gentle" preferences are discriminated to change the driving characteristics based on the discriminated results.

For discriminating the congested road and highway runnings, the values $\Delta\theta_{th}$, dN/dt and v shown in FIGS. 1A, 1B and 5A to 5F are chosen as the measuring variables. For discriminating the preferences, the measuring variables $\Delta\theta_{th}$ and dN/dt are chosen.

Figure 11:
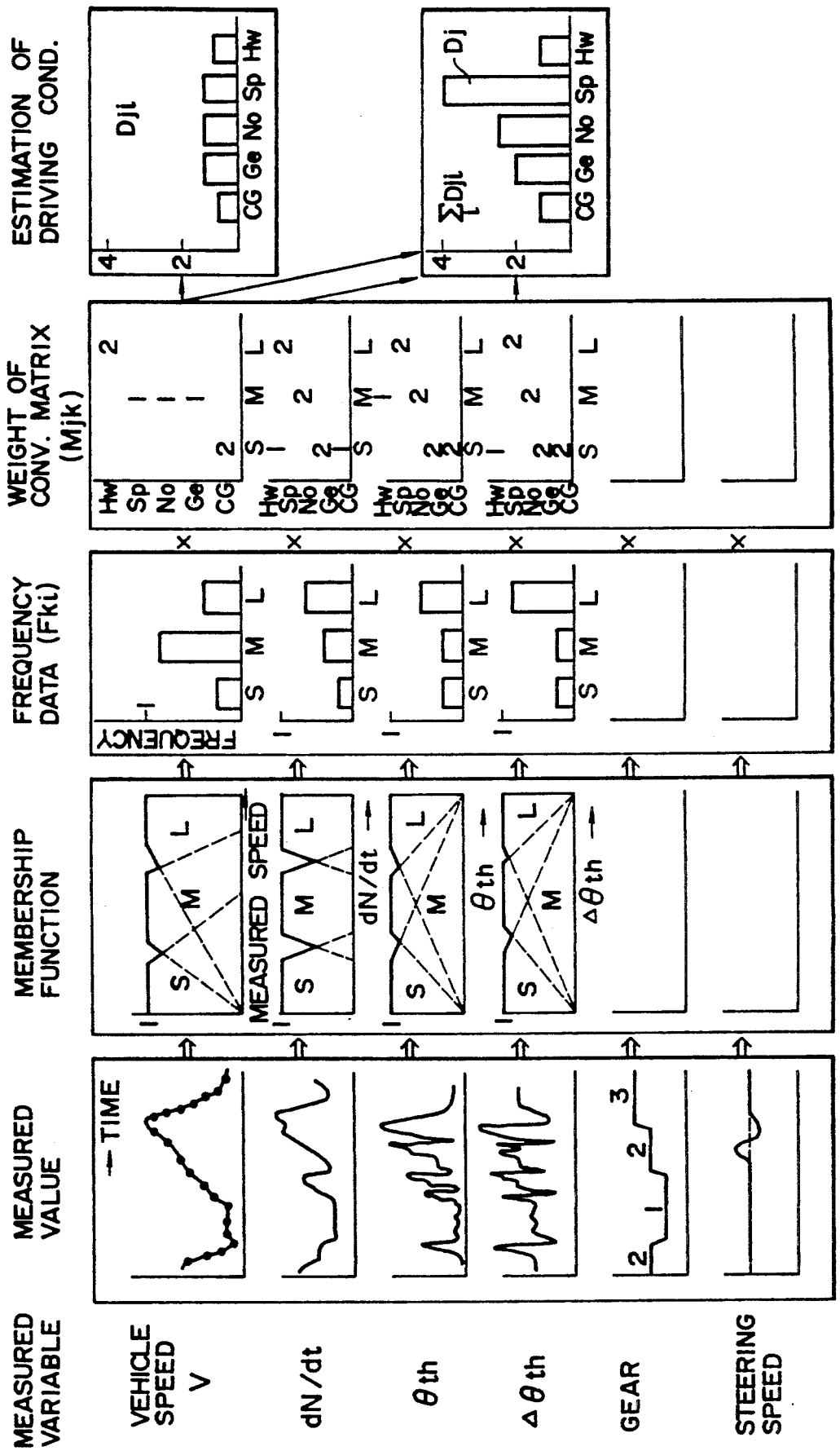
FIG. 11 illustrates the concepts of the engine control process contents according to a third embodiment of the invention.

As a result, in this embodiment, v, $\Delta\theta_{th}$ and dN/dt are chosen as the measuring variables, and as the values of the conversion matrix Mjk, the values obtained by combining the values shown in FIGS. 4 and 7 are chosen as shown in FIG. 11.

FIG. 11 shows the concepts of the engine control process contents of the third embodiment, and corresponds to those shown in FIGS. 4 and 7.

In this embodiment, the driving conditions, i.e., driving environments and driver's preferences are estimated using the measuring values v, $\Delta\theta_{th}$ and dN/dt in accordance with the flow chart shown in FIG. 3, in the similar manner to the first and second embodiments.

The driving conditions, i.e., driving environments and driver's preferences can be obtained by the equation (1) at block 51, where Dji = value indicating a possibility of each driving condition (preference and driving environment),
i = number of measuring variable: v, $\Delta\theta_{th}$, dN/dt,
j = number of driving condition (preference and driving environment): Congested (CG), Sporty (Sp), Normal (No), Gentle (Ge), Highway (Hw).

The driving environment and driver's preference are determined during the evaluation period as in the following. The values Dji for necessary measuring variables (i) are added together. Namely, the values of Dji for dN/dt and $\Delta\theta_{th}$ are added together to obtain $$\sum_i Dji$$

for each driver's preference and each driving environment. Like the driver's preference and the driving environment, the driving condition (j) is determined and takes a largest value among the added results $$\sum_i Dji.$$

In particular, in the example shown in FIG. 11, the value of $$\sum_i Dji$$

for Sp preference is the largest among the calculated values $$\sum_i Dji$$

for CG and Hw driving environments and Sp, Ge and No driver's preferences. The value Dj is determined as the driving condition variable for the "Sporty" preference.

The driving characteristics are changed in accordance with the determined driving condition variable Dj at block 53 in a similar manner to the first and second embodiments.

In particular, for example, in the case where the spark timings are controlled in accordance with the value Dj, the spark timings are advanced until the allowable maximum torque is obtained in the case of Hw and Sp. The normal spark timings are used in the case of No. The spark timings are delayed in the case of CG and Ge.

If the injected fuel amount is controlled in accordance with the value Dj, the coefficient $k_M$ of the equation (5) is set as in the following.

Sporty and Highway ... $k_M = 1.1$
Normal ... $k_M = 1.0$
Congested and Gentle ... $k_M = 0.9$ As above, the spark timings, fuel injection time, depression repulsion force of acceleration pedal and the like are selectively controlled in accordance with the value Dj, in a similar manner to the first and second embodiments.

Next, the fourth embodiment of the present invention will be described.

There is a method of discriminating based on the driving condition during the normal driving as described with the second embodiment. However, the period while the driver's preference is predominant is at the transition conditions. Therefore, a method can be realized whereby the driver's preference is discriminated during both the normal driving conditions and the transition conditions, or based on only the transition conditions. This method makes it easier to discriminate the driver's preference.

The driver's preference may be discriminated based on, for example, the manner the accelerator pedal is depressed at the start or constant speed running, the manner the brake pedal is depressed before stopping, the manner the steering wheel is rotated during driving, and the like.

Therefore, in order to discriminate the driver's preference, particular cases among the driving conditions are selected to analyze the driver action during such cases. To recognize the driving conditions during a predetermined period, it is practical to classify and process the driver action using membership functions of the Fuzzy theory similar to the above embodiments.

The discrimination of the driver's preference and the method of changing the driving characteristics of a vehicle in accordance with the discrimination results will be described with reference to the flow chart shown in FIG. 12. The flow chart of FIG. 12 includes a driving condition judging unit (blocks 55 and 56) for judging the driving conditions used in discriminating the driver's preference. The block 50 of the flow chart shown in FIG. 3 is omitted.

With the driving condition judging unit, judging takes place at block 55 using the measured values of a measuring variable. Whether the driving condition is within the range suitable for discriminating the driver's preference or not is determined. If it is within the range, the process of the block 43 and succeeding blocks is performed. If not, it exceeds the upper limit of the range or does not reach the lower limit. In one of the two cases, initial values for use in the next discrimination are set (block 56), and in the other case, no process is performed or such initial values are also set.

At block 52, the driver's preference as the driving condition is determined. The driving characteristics are changed in accordance with the determined result. As the changing methods, a proper method is selected from the above-described technology.

Figure 13:
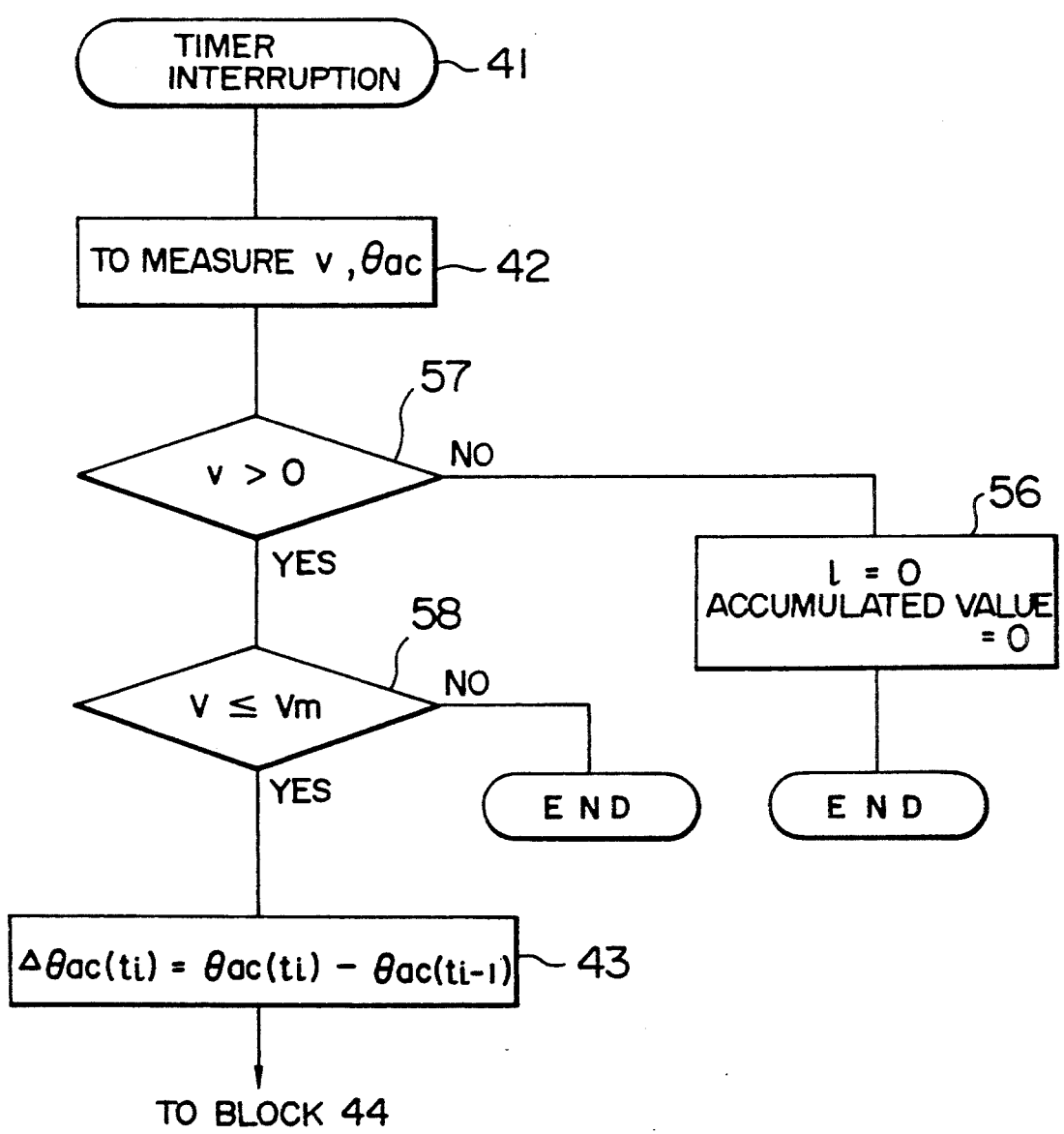
FIG. 13 is a flow chart showing an example of the driving condition discrimination unit shown in FIG. 12.

A particular example associated with the driving condition judging unit (blocks 55 and 56) will be described with reference to FIG. 13 where a start time is selected as a driving condition for discriminating the driver's preference.

First, at block 42, the measuring variables v and $\theta_{ac}$ necessary for judging driving condition are measured.

Figure 12:
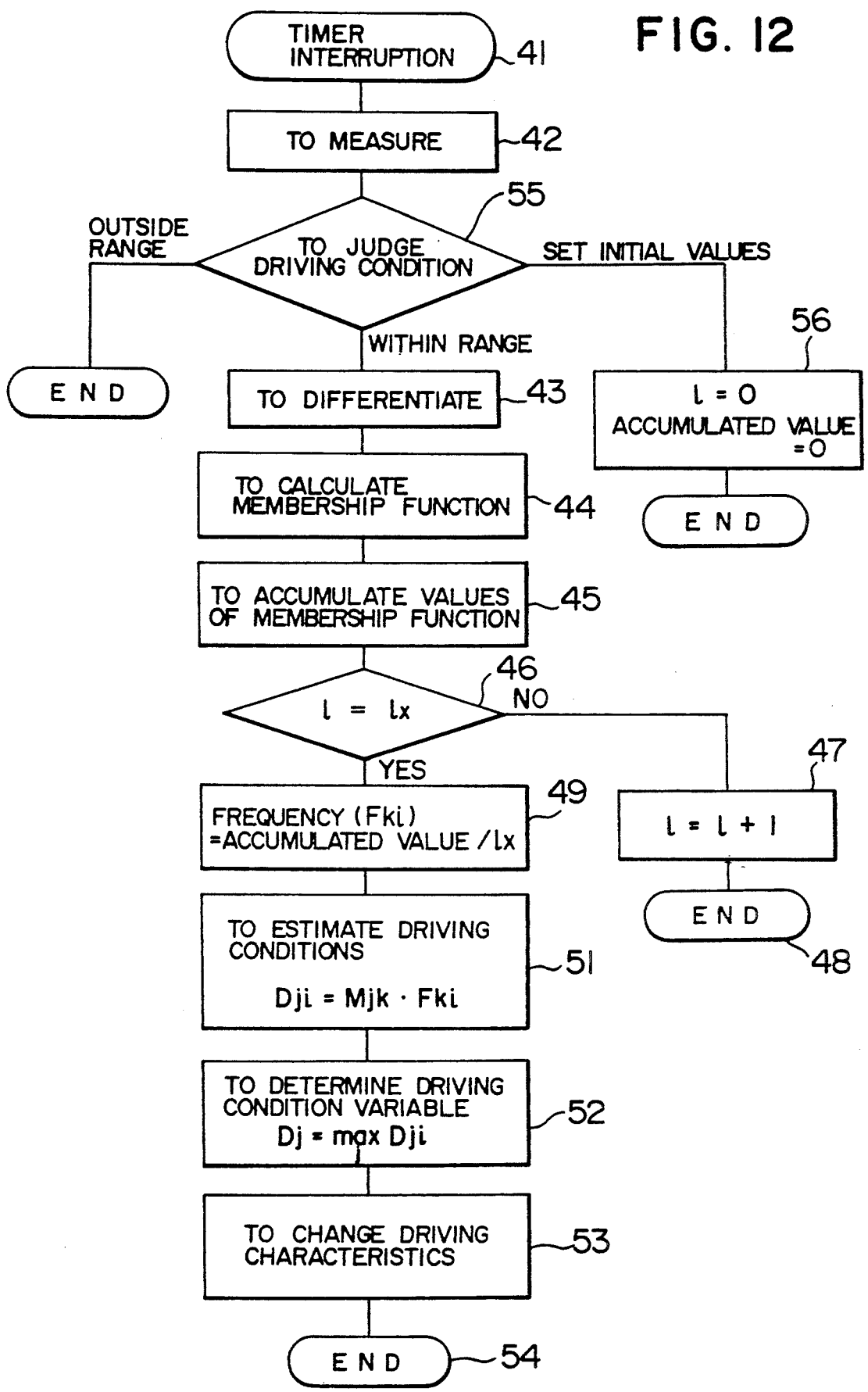
FIG. 12 is a flow chart showing the engine control operation according to a fourth embodiment of the invention.

The blocks 57 and 58 correspond to block 55 of FIG. 12. The vehicle speed v is judged at block 57 to determine whether it is positive or not. If v=0, initial values (l=0, accumulated value=0) are set at block 56 and the process terminates. If it is judged v>0, it is judged at block 58 as to whether v>vm or not. If v>vm, the process terminates. If v≦vm, the flow advances to block 43. Thus, at the start condition, i.e., vm≧v>0, the process at block 43 and succeeding blocks is performed to discriminate the driving condition (preference). To discriminate the preference during the period while the driving condition is at the start thereof, the change ratio $\Delta\theta_{ac}$ of $\theta_{ac}$ is calculated at block 43. Namely, a difference $\Delta\theta_{ac}(ti)=\theta_{ac}(ti)-\theta_{ac}(ti-1)$ between the present measured value $\theta_{ac}(ti)$ and the preceding measured value $\theta_{ac}(ti-1)$ is calculated.

Figure 14A:
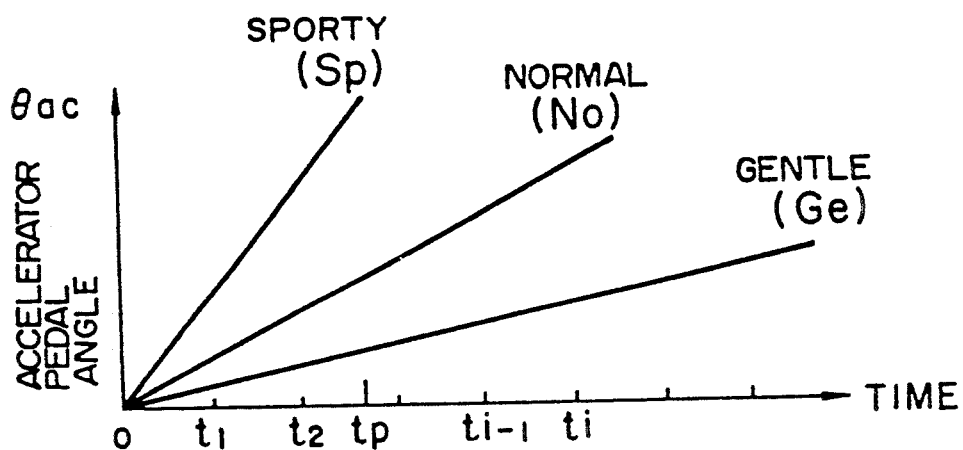
FIGS. 14A to 14D illustrate the process contents shown in FIG. 12.

The manner in which driver depresses the accelerator pedal at the start of driving has been studied and is shown in FIG. 14A. A driver with "Sporty (Sp)" preference abruptly accelerates, and a driver with "Gentle (Ge)" preference slowly accelerates. A driver with "Normal (No)" preference depresses the pedal in the normal manner.

Figure 14B:
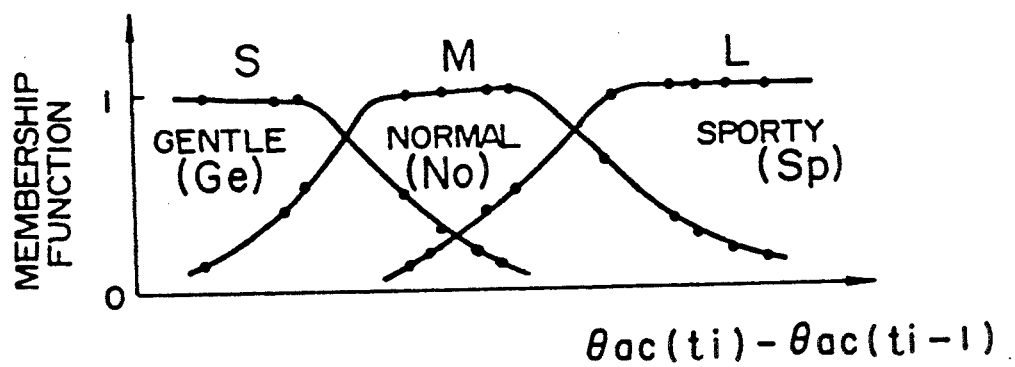

Thus, as the measured values $\Delta\theta_{ac}(ti)$ are applied to membership functions, the membership function values are obtained from the values $\theta_{ac}$ measured a plurality of times as shown in FIG. 14B (block 44 in FIG. 12).

A judgement at block 46 as to whether l=lx is incorporated in this embodiment in order to check only the driving condition at the start thereof without checking the other normal running conditions after the start of driving. In other words, checked are only those values $\Delta\theta_{ac}$ until a predetermined time lapse after the start of driving. Using the membership functions, the process at blocks 45 and 49 shown in FIG. 12 is sequentially performed. In this embodiment, since the measuring variable (i) is $\Delta\theta_{ac}$ alone, the calculation at block 51 is made by Dji=Mjk·Fki.

Figure 14C:
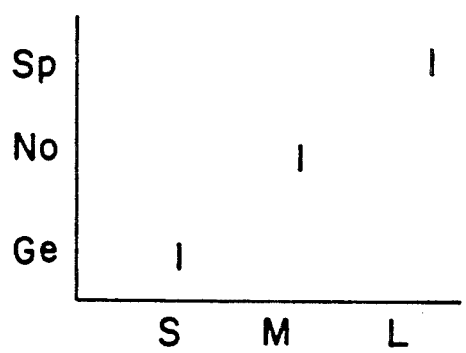

FIG. 14C shows an example of the conversion matrix Mjk of this embodiment.

Figure 14D:
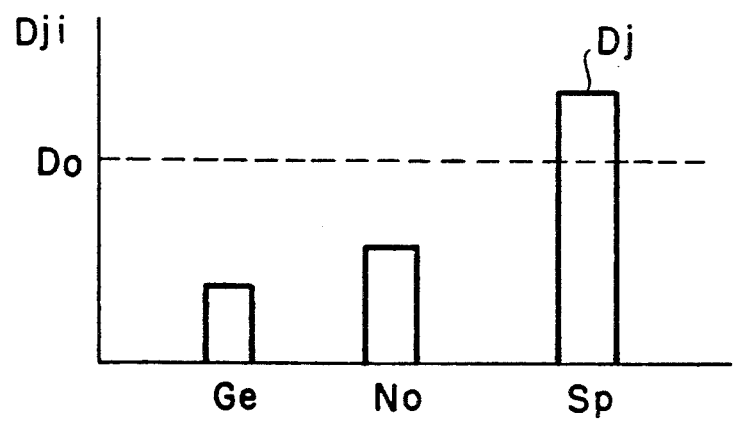

FIG. 14D shows an example of the values Dji for a driving condition (preference) obtained at block 52.

The driver's preference is discriminated based on the values Dji obtained for each condition (preference: Sp, No and Ge).

In particular, the condition (j) whose value Dji exceeds a predetermined threshold value Do is determined as the driver's preference. Namely, the value Dj is determined as the value of Dji for "Sporty (Sp) (block 52).

At block 53, the driving characteristics may be changed in accordance with the determined result. In this embodiment, however, the method described below is used.

In particular, at block 53, the driving condition variable is stepwise changed as in the following in accordance with the determined result.

If the driving condition is determined as Sp, the next condition variable is selected as No in case where the present condition variable is Ge, Sp for the present condition variable No, and Sp for the present condition variable Sp.

If it is determined as Ge, No is selected in case where the present condition variable is Sp, Ge for the present condition variable No, and Ge for the present condition variable Ge.

The process is performed in the similar manner as described with block 53 of the second embodiment, using the value Dj thus changed.

The present invention may be arranged in the following as modifications of the above embodiments.

Even in the case where the driving condition is not the transition condition but the normal running, engine control can be conducted in a similar manner to the above embodiments in accordance with the driver's preference. For instance, the engine speed change ratio $\Delta N$ relative to the accelerator pedal motion $\theta_{ac}$ is measured during the normal running to adjust the repulsion force of the accelerator pedal. For instance, for a driver whose accelerator pedal action is likely to cause an overshoot of the engine speed, the repulsion force adjustment function is controlled so as to reduce the repulsion force.

For a driver who often performs racing of a manual transmission (MT) vehicle, the repulsion force adjustment function may be controlled so as to change the condition variable to "Sporty" mode.

The above-described discrimination of a driver's preference has been conducted mainly relying upon the motion of the accelerator pedal. By using the motion of the brake pedal as well, the following discrimination adjustment is possible.

For a driver using an automatic transmission (AT) vehicle without depressing the brake pedal prior to the start at D range, "Gentle" mode is set as the driving condition to avoid possible accident due to an abrupt start. For a driver using an AT (automatic transmittion) vehicle and forcing the vehicle to start while raising the engine speed with both the brake pedal and the accelerator pedal being depressed at a time, "Sporty" mode is set.

According to a synthetic study of the driving actions of a driver as described above, particularly those actions at the acceleration, and according to the classification of the driving conditions into a plurality of driving actions, the correspondence between driving actions and vehicle acceleration characteristics (acceleration patterns) can be ruled as in the following manner. The acceleration pattern can be characterized by the leading waveform and the acceleration value at the stable state.

(1) Driving Action 1

"Large stroke of quick depression of accelerator pedal at acceleration"

Figure 15A:
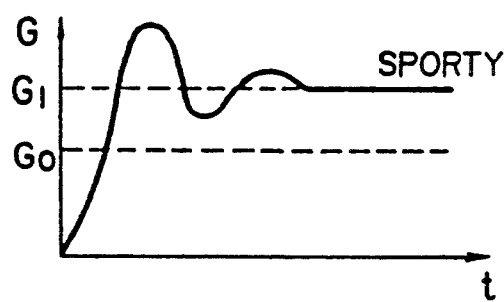
FIGS. 15A to 15E show various patterns of target acceleration rate characteristics.

This driving action is often used by young people, and corresponds to the acceleration pattern of: "Sporty (SP)" driving condition and rapid acceleration characteristic pattern as shown in FIG. 15A with a high stable acceleration rate (level G1).

(2) Driving Action 2

"Frequent operations of acceleration pedal, steering wheel, and brake"

Figure 15B:
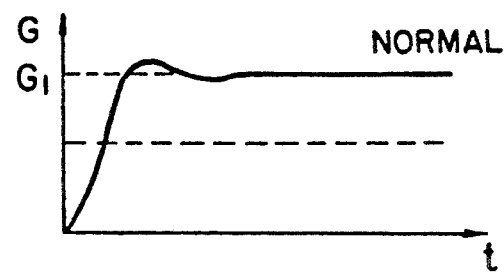
Figure 15C:
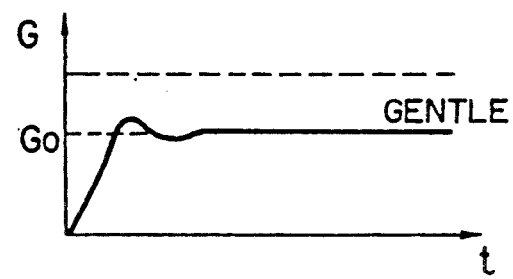

This driving action is often seen during a mountain road running, and corresponds to the acceleration pattern of: "Normal" (No) driving condition, in some cases rapid acceleration rate characteristic pattern as show in FIG. 15B with a stable acceleration rate (level G1), and in other cases gentle acceleration rate characteristic pattern as shown in FIG. 15C with a small stable acceleration rate (level G0) which is smaller than G1.

(3) Driving Action 3

"Gradual increase/decrease of accelerator pedal depression with gradual change in vehicle speed"

Figure 15D:
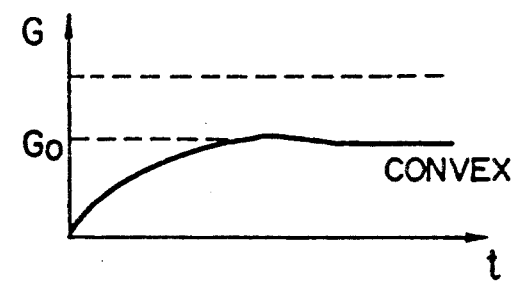

This driving action is often used by middle and old age people, and corresponds to the acceleration rate pattern of: gradual acceleration rate characteristic pattern as shown in FIG. 15D with a convex waveform.

(4) Driving Action 4

"Frequent operations of accelerator pedal at small opening degree with low vehicle speed"

This driving action corresponds to the acceleration rate pattern of: "Congested (CG)" driving condition and gradual acceleration rate characteristic pattern as shown in FIG. 15E with a linear waveform.

(5) Driving Action 5

"Unsmoothed and choppy depression of accelerator pedal with small fluctuation of vehicle speed"

Figure 15E:
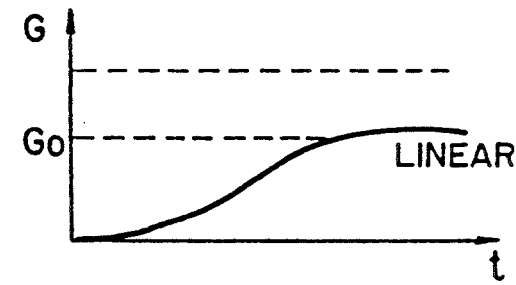

This driving action is often used by beginners and corresponds to acceleration rate characteristic pattern as shown in FIG. 15E.

According to the fifth embodiment of the present invention, the driver's intents are classified into the above five driving actions. The acceleration rate characteristic is adjusted so as to match the particular classified intent. Namely, in the similar manner to the above embodiments, the measuring variables including accelerator pedal angle, brake angle, vehicle speed, and etc. are continuously measured. The measured values are processed using membership functions in the similar manner to that described with blocks 43 to 52 shown in FIG. 3 to judge which one of the five acceleration rate patterns belongs to a particular driver's intent (driving environment and preference). The judging results are stored in the RAM.

Figure 16:
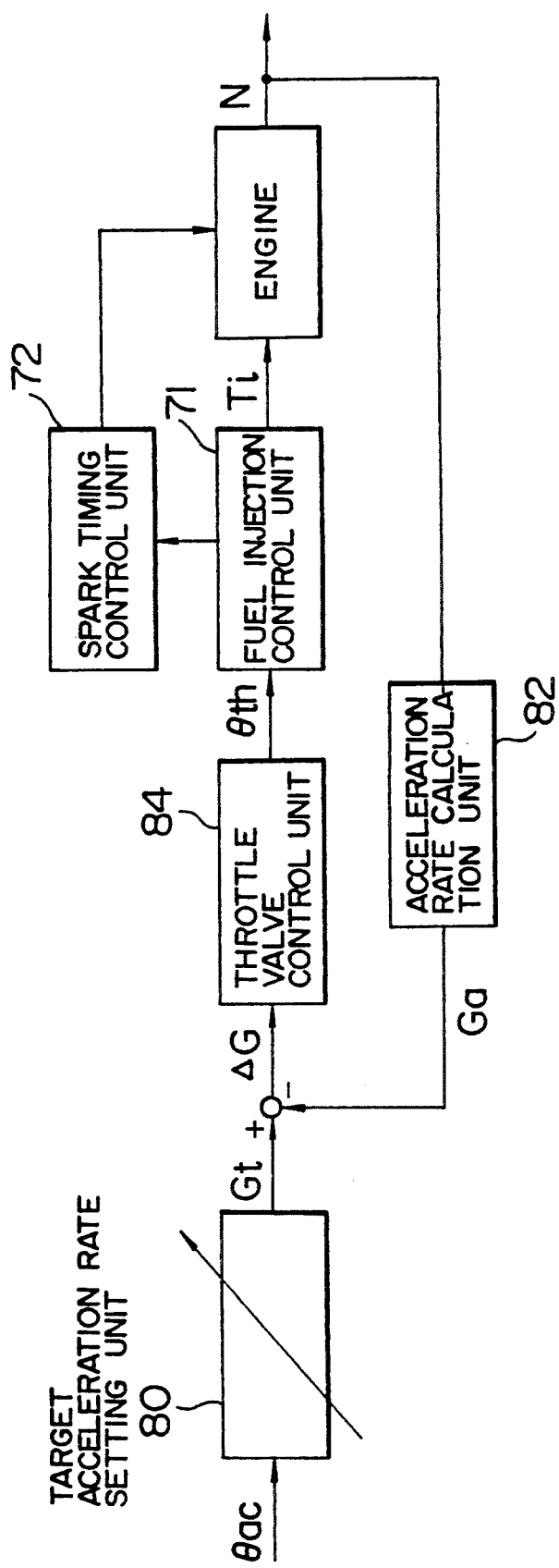
FIG. 16 is a block diagram for explaining the engine control operation according to a fifth embodiment of the invention.

On the other hands, in the ROM of the control unit 10, equations for calculating the five acceleration rate characteristic patterns are stored beforehand. The acceleration rate characteristic patterns as shown in FIGS. 15A to 15E can be automatically obtained if drivers with preferences depress the accelerator pedal to a predetermined angle (e.g., $\frac{3}{4}\, \theta_{ac\,max}$). FIG. 16 is a functional block diagram for explaining the operation of this embodiment. The functions of blocks in FIG. 16 are realized by the control unit 10. A target acceleration rate setting unit 80 calculates the target acceleration rate Gt corresponding to the pattern (one of the five patterns shown in FIGS. 15A to 15E) stored in the RAM by using the following equation (7).

$$Gt = \frac{k \cdot \theta_{ac}}{S^2 + 2\zeta\omega_n p + \omega_n^2} \quad (7)$$

The equation (7) is a second order delay transfer function for calculating the target acceleration rate Gt corresponding to $\theta_{ac}$.

The acceleration pattern can be changed in accordance with the adjustment parameter value $\zeta$ of the transfer function. Therefore, the parameter value $\zeta$ corresponding to the acceleration pattern determined through discrimination is given to the equation (7) to calculate the value Gt.

The target acceleration rate Gt is compared with an actual vehicle acceleration rate Ga from an acceleration rate calculation unit 82 to obtain a difference $\Delta G = Gt - Ga$ which is supplied to a throttle valve control unit 84.

The acceleration rate calculation unit 82 calculates the value Ga by the following equation using the difference dN/dt of the engine speed N.

$$Ga = a \cdot \frac{dN}{dt}$$

where a is a value determined by the gear ratio and the like. The acceleration rate Ga may be obtained based on an output signal v from the vehicle speed sensor 12.

The throttle valve control unit 84 reads, for example, from the RAM map the throttle valve opening degree $\theta_{th}$ corresponding to $\Delta G$ to thereby electrically control the throttle valve opening degree at $\theta_{th}$.

The target acceleration rate tracking control may be conducted in the similar manner as described with the above-referenced U.S. Pat. No. 55,530. In other words, the above-mentioned tracking control can be called as an acceleration rate servo-control.

The five patterns are typical, and other various modified patterns with specific values may be set according to the driver's preferences and characteristics by adjusting the value of $\zeta$ in the equation (7).

As described above, the Fuzzy rule type method is effective in obtaining a correspondence among non-linear characteristics.

According to the present invention, the driver's preference and the running environments of all types can be discriminated with a computer mounted on the vehicle, and the engine characteristic matching the discrimination result can be realized. In other words, the control apparatus mounted on the vehicle allows the driving characteristic to conform with the driver's intent from time to time so that operability is considerably improved as compared with the conventional embodiment, thereby advantageously ensuring good driveability and comfortable riding.

Further, after identifying the driving environment, the driver's preferences of driveability can be discriminated to match the identified driving environment. Therefore, the driver's preference which differs from the environment can be reflected in the engine control characteristics. Thus, it becomes possible to supply a vehicle capable of matching the preferences of various drivers.

Even if a vehicle whose engine characteristics are adjusted to match "Gentle" or "Normal" preference, the engine characteristics can be changed to "Sporty" preference after abrupt accelerator pedal depression, thus avoiding possible danger.

Various engine characteristics can be obtained which match specific time, location, and opportunity, as compared with the conventional systems, thus satisfying various types of drivers.

If a driver does not desire a change in the driving characteristics, a selection switch of the driving characteristics may be fixed to obtain such effect. Also, specific driving characteristics may be selected by the selection switch.

We claim:

1. A method of controlling an internal combustion engine for a vehicle comprising the steps as follows:
   detecting a plurality of driving actions made by an operator of the vehicle;
   detecting a plurality of operating conditions of the vehicle;
   estimating a driver's preference for driveability of the vehicle comprising determining occurrence frequencies of the driving actions and operating conditions over a predetermined period; and,
   selectively adjusting engine operation in accordance with the estimated driver's preference.

2. The method as described in claim 1 wherein the estimating further includes:
   categorizing the driving actions and operating conditions into preselected ranges representative of the driver's preference;
   processing the occurrence frequencies relative to the ranges with a membership function and a weighing function to identify possibility values for an each one of plural types of driver's preference for an each one of the driving actions and operating conditions; and, summing the possibility values for the each type of driver's preference to identify the estimated driver's preference as having a maximum possibility value.

3. An electronic engine control apparatus for selectively adjusting vehicle operation by categorizing the driving action and operating conditions with respect to plural types of a driving environment of a vehicle and/or a driver's preference for driveability and by discriminating at least one of the plural types, comprising:

a plurality of first sensors for detecting the driving action taken by a driver and including means for generating a first output signal value representative thereof;

a plurality of second sensors for detecting the operating conditions of the vehicle and an engine and including means for generating a second output signal value representative thereof;

discrimination means for classifying the first and second output signal values into a plurality of predetermined ranges, for calculating occurrence frequencies in respective ranges of the output signal values, for calculating a possibility value of the plural types by combining the calculated occurrence frequencies in the respective ranges of the output signal values of said first and second sensors and for determining the one of the plural types which has a largest possibility value among the plural types as a driving environment and/or a driver's preference at a present time; and, control means for controlling the engine by selectively adjusting at least one of a plurality of actuators for controlling the engine in accordance with the determined type.

4. An electronic engine control apparatus according to claim 3, wherein said discrimination means includes means for measuring the first and second output signals from said first and second sensors a plurality of times during a plurality of engine cycles, and means for discriminating the driving environment and/or driver's preference, in accordance with said measured values.

5. An electronic engine control apparatus according to claim 4, further including means for classifying the driving environments of a vehicle into a congested road, an urban street, a suburban road, a mountain road, and a highway, and said discrimination means includes means for discriminating the driving environment in accordance with output signals from said first and second sensors.

6. An electronic engine control apparatus according to claim 5, wherein said second sensors include a vehicle speed sensor for detecting a vehicle speed, a revolution number sensor for detecting a number of revolutions of an engine, and a throttle valve position sensor for detecting an opening degree of a throttle valve, and wherein, said discrimination means includes means for discriminating the driving environment of the vehicle in accordance with output signals from said vehicle speed sensor, revolution number sensor and throttle valve position sensor.

7. An electronic engine control apparatus according to claim 6, wherein said discrimination means includes means for calculating an engine revolution number change ratio using an output signal from said revolution number sensor, further for calculating a throttle valve opening degree change ratio using an output signal from said throttle valve position sensor, and for classifying the obtained vehicle speed, revolution number change ratio and throttle valve opening degree change ratio into large, middle and small ranges, and wherein said discrimination means includes means for discriminating the driving environment as a highway if the vehicle speed is high, as a congested road if the vehicle speed is low and the engine acceleration is small, as a mountain road if the throttle valve opening degree change ratio and the revolution number change ratio are large, and as an urban street if the vehicle speed and the engine revolution number change ratio take intermediate values.

8. An electronic engine control apparatus according to claim 5, wherein said discrimination means comprises:

a unit for calculating the occurrence frequencies in the respective ranges of each output signal value by applying membership functions of a Fuzzy theory to the output signals of said first and second sensors;

a unit for obtaining the possibility value of each driving environment by performing a conversion matrix calculation from the occurrence frequencies in the respective ranges of each output signal into the driving environments; and a unit for discriminating an objective driving environment which has a maximum possibility value among the driving environments.

9. An electronic engine control apparatus according to claim 5, wherein said first sensors include a gear shift sensor for detecting a gear shift by a shift lever, a brake sensor for detecting a depression of a brake pedal, an accelerator pedal sensor for detecting a depression of an accelerator pedal, and a steering sensor for detecting a motion of a steering, and said second sensors include a vehicle speed sensor for detecting a vehicle speed and wherein said discrimination means includes means for classifying the frequency of the gear shift, the frequency of the steering, the frequency of the brake depression and the frequency of the accelerator pedal depression into the respective ranges, respectively, in accordance with the output signals from said first and second sensors, for classifying the vehicle speed into the respective ranges for discriminating the driving environments based on the classification results.

10. An electronic engine control apparatus according to claim 9 wherein said discrimination means includes means for discriminating the driving environment as a highway running if the vehicle speed is high and the frequency of the gear shift is large, and as a congested road running if the vehicle speed is low and the frequency of the brake pedal depression is high.

11. An electronic engine control apparatus according to claim 10 wherein said discrimination means includes means for discriminating the driving environment as a mountain road running if both the frequencies of the steering motion and the depression change between the brake and accelerator pedals are large.

12. An electronic engine control apparatus according to claim 9 wherein said discrimination means includes means for discriminating the driving environment as an urban street running if both the frequencies of the steering motion and the brake actuation are high.

13. An electronic engine control apparatus according to claim 9 wherein said discrimination means includes means for discriminating the driving environment as a suburban road running if the vehicle speed is maintained near a limited speed and the frequency and range of the steering motion are small.

14. An electronic engine control apparatus according to claim 5, wherein one of said plurality of actuators is fuel injection valves, and wherein said control means includes means for controlling said fuel injection valves in such a manner that the ratio of an injected fuel amount to a sucked air amount increases relatively at said respective driving environments of the congested road, urban street, mountain road and highway in this order.

15. An electronic engine control apparatus according to claim 5, wherein one of said plurality of actuators is ignition plugs, and wherein said control means includes means for controlling said ignition plugs in such a manner that ignition timings advance relatively at said respective driving environments of the congested road, urban street, mountain road, and highway in this order.

16. An electronic engine control apparatus according to claim 5, wherein one of said plurality of actuators is a means for adjusting a repulsion force of an accelerator pedal, and wherein, said control means includes means for controlling said repulsion force adjusting means in such a manner that the repulsion force is reduced relatively at said respective driving environments of the congested road, urban street, mountain road, and highway in this order.

17. An electronic engine control apparatus according to claim 5, wherein one of said plurality of actuators is means for controlling a throttle valve opening degree through conversion of the depression angle of an accelerator pedal into the throttle valve opening degree, and wherein said control means includes means for controlling said throttle valve opening degree controlling means in a manner that conversion ratios from the accelerator pedal depression angle into the throttle valve opening degree increase relatively at said respective driving environments of the congested road, urban street, mountain road, and highway in this order.

18. An electronic engine control apparatus according to claim 4, further including means for classifying the driver's preference to driveability into sporty, normal, and gentle types, and said discrimination means includes means for discriminating the driver's preference in accordance with the output signals from said first and second sensors.

19. An electronic engine control apparatus according to claim 18, wherein said discrimination means comprises:

a unit for calculating the occurrence frequencies of respective ranges of each output signal value by applying membership functions of a Fuzzy theory to the output signals of said first and second sensors;

a unit for obtaining the possibility value of each driver's preference by performing conversion matrix calculation from the occurrence frequencies in the respective ranges of each output signal into the driver's preferences; and a unit for discriminating an objective driver's preference which has a maximum possibility value among the driver's preferences.

20. An electronic engine control apparatus according to claim 18, wherein said first sensors include a sensor for detecting the depression angle of an accelerator pedal, and wherein said discrimination means includes means for discriminating the preferences as a sporty type if the driver abruptly depresses the accelerator pedal.

21. An electronic engine control apparatus according to claim 18, wherein said first sensors include a sensor for detecting the depression position of an accelerator pedal, and a sensor for detecting the depression position of a brake pedal, and wherein said discrimination means includes means for discriminating the driver's preference to driveability based on the depressions and depression frequencies of the accelerator and brake pedals.

22. An electronic engine control apparatus according to claim 18, wherein said first sensors include a sensor for detecting the depression position of an accelerator pedal, a sensor for detecting a depression position of a brake pedal, and a sensor for detecting a gear position of a shift lever, said second sensors include a sensor for detecting a vehicle speed, and a sensor for detecting an engine revolution number, and said discrimination means includes means for discriminating the driver's preference based on the output signals from said first and second sensors.

23. An electronic engine control apparatus according to claim 18 wherein one of said plurality of actuators is fuel injection valves, and wherein said control means includes means for controlling said fuel injection valves in such a manner that the ratios of an injected fuel amount to a sucked air amount increase relatively as said respective driver's preference to the gentle, normal, and sporty types in this order.

24. An electronic engine control apparatus according to claim 18, wherein one of said plurality of actuators is ignition plugs, and wherein said control means includes means for controlling said ignition plugs in such a manner that the ignition timings advance relatively at said respective driver's preference to the gentle, normal, and sporty types in this order.

25. An electronic engine control apparatus according to claim 24, wherein one of said plurality of actuators is means for adjusting the repulsion force of an accelerator pedal, and wherein said control means includes means for controlling said repulsion force adjusting means in such a manner that the repulsion forces reduce relatively at said respective driver's preferences to the gentle, normal, and sporty types in this order.

26. An electronic engine control apparatus according to claim 18, wherein one of said plurality of actuators is means for controlling a throttle valve opening degree through conversion of the depression angle of an accelerator pedal into the throttle valve opening degree, and wherein said control means includes means for controlling said throttle valve opening degree controlling means in such a manner that conversion ratios from the accelerator pedal depression angle into the throttle valve opening degree increase relatively at said respective driver's preferences to the gentle, normal, and sporty types in this order.

27. An electronic engine control apparatus according to claim 18, wherein said discrimination means includes means for detecting a transition condition of the driving condition based on the output signals from said first and second sensors, and for discriminating the driver's preference based on the output signals from said first and second sensors during the transition condition.

28. An electronic engine control apparatus according to claim 27 wherein said discrimination means includes means for detecting a driving start as said transition condition, for calculating an accelerator pedal depression position change ratio based on an output signal of an accelerator pedal depression position sensor as said first sensor, and for discriminating the driver's preference based on the depression position change ratio at the driving start.

29. An electronic engine control apparatus according to claim 28, wherein said discrimination means includes means for classifying the accelerator pedal depression change ratios into large, middle, and small types and for discriminating the driver's preferences as the sporty, normal, and gentle types if the change ratios are large, middle, and small types, respectively.

30. An electronic engine control apparatus according to claim 18 wherein said second sensors include a revolution number sensor for detecting the number of revolutions of an engine, and a throttle valve position sensor for detecting the opening degree of a throttle valve, and wherein said discrimination means includes means for discriminating the driver's preference in accordance with output signals from said revolution number sensor and throttle valve position sensor.

31. An electronic engine control apparatus according to claim 30, wherein said discrimination means includes means for calculating an engine revolution number change ratio using an output signal from said revolution number sensor, further for calculating a throttle valve opening degree change ratio using an output signal from said throttle valve position sensor, and for classifying the obtained revolution number change ratio and throttle valve opening degree change ratio into the respective ranges, and wherein said discrimination means includes means for discriminating as the sporty type if the revolution number change ratio, throttle valve opening degree, and throttle valve opening degree change ratio are large, as the normal type if they are middle, and as the gentle type if they are small.

32. An electronic engine control apparatus according to claim 4, further including means for classifying the driving environments of the vehicle and the driver's preferences to driveability into a plurality of types, and for discriminating a particular type in accordance with the output signals from said first and second sensors.

33. An electronic engine control apparatus according to claim 32, including means for classifying the driving environments into a highway, congested road and other driving environments, and further for classifying the driver's preference to sporty, normal, and gentle types.

34. An electronic engine control apparatus according to claim 33, wherein said second sensors include a vehicle speed sensor for detecting a vehicle speed, a revolution number sensor for detecting the number of revolutions of an engine, and a throttle valve position sensor for detecting the opening degree of a throttle valve, and wherein said discrimination means includes means for discriminating the present time driving environment in accordance with output signals from said vehicle speed sensor, revolution number sensor, and throttle valve position sensor.

35. An electronic engine control apparatus according to claim 34, wherein said discrimination means includes means for calculating an engine revolution number change ratio using an output signal from said revolution number sensor, further for calculating a throttle valve opening degree change ratio using an output signal from said throttle valve position sensor, and for classifying the obtained vehicle speed, revolution number change ratio, and throttle valve opening degree change ratio into respective ranges, and wherein said discrimination means includes means for discriminating the driving environment as the highway if the vehicle speed is high, as the congested road if the vehicle speed is low and the engine revolution number change ratio is small, and discriminating the driver's preference as the sporty type is the engine revolution number change ratio, throttle valve opening degree and throttle valve opening degree change ratio are large, as the normal type if they are middle, and as the gentle type if they are small.

36. An electronic engine control apparatus according to claim 33, wherein one of said plurality of actuators is fuel injection valves, and wherein said control means includes means for setting a first air/fuel mixture ratio if the driving environment is a congested road or the driver's preference is the gentle type, a second air/fuel mixture ratio if the driver's preference is the normal type, and a third air/fuel mixture ratio if the driving environment is the highway or the driver's preference is the sporty type, and for controlling the fuel injection valve in a manner that the mixture ratios increase relatively at the respective mixture ratios of the first, second, and third ratios in this order.

37. An electronic engine control apparatus according to claim 33, wherein one of said plurality of actuators is ignition plugs, and wherein said control means includes means for setting first spark timings if the driving environment is the congested road or the driver's preference is the gentle type, second spark timings if the driver's preference is the normal type, and third spark timings if the driving environment is the highway or the driver's preference if the sporty type, and for controlling the ignition plugs in such a manner that the spark timings advance relatively at the respective spark timings of the first, second, and third spark timings in this order.

38. An electronic engine control apparatus according to claim 33, wherein one of said plurality of actuators is means for adjusting a repulsion force of an accelerator pedal, and wherein said control means includes means for setting a first repulsion force if the driving environment is the congested road or the driver's preference is the gentle type, a second repulsion force if the driver's preference is the normal type, and a third repulsion force if the driving environment is the highway or the driver's preference is the sporty type, and for controlling said repulsion force adjusting means in such a manner that the accelerator pedal repulsion forces reduce relatively at said respective repulsion force of the first, second, and third repulsion forces in this order.

39. An electronic engine control apparatus according to claim 33, wherein one of said plurality of actuators is means for controlling a throttle valve opening degree through conversion of the depression angle of an accelerator pedal into the throttle valve opening degree, wherein said control means includes means for setting a first conversion ratio of the accelerator pedal depression angle into the throttle valve opening degree if the driving environment is the congested road or the driver's preference is the gentle type, a second conversion ratio if the driver's preference is the normal type, and a third conversion ratio if the driving environment is the highway or the driver's preference is the sporty type, and for controlling said throttle valve opening degree controlling means in such a manner that the conversion ratios increase relatively at the respective conversion ratios of the first, second, and third conversion ratios in this order.

40. An electronic engine control apparatus according 32, wherein said discrimination means comprises:

a unit for calculating the occurrence frequencies of the respective ranges of each output signal value by applying membership functions of a Fuzzy theory to the output signals of said first and second sensors;

a unit for obtaining the possibility value of each driving environment and each driver's preference by performing conversion matrix calculation from the occurrence frequencies of the respective ranges of each output signal into the driving environments and the driver's preferences; and a unit for discriminating an objective driving environment and an objective driver's preference which have maximum possibility values among the driving environments and the driver's preferences, respectively.

41. An electronic engine control apparatus according to claim 4, including means for classifying the driving action of a driver in acceleration periods into a plurality of acceleration characteristic patterns, and said discrimination means include means for discriminating a present time acceleration characteristic pattern based on the output signals from said first and second sensors, and wherein said control means includes an acceleration rate controlling mechanism for changing the coefficient of said acceleration rate controlling mechanism in accordance with the discriminated acceleration characteristic pattern.

42. An electronic engine control apparatus useful for implementing a plurality of types of operation for a vehicle comprising:

a plurality of first sensors for detecting a driving action taken by a driver;

a plurality of second sensors for detecting operating conditions of the vehicle and an engine;

discriminating means for classifying output signal values of each of said first and second sensors measured during a predetermined period into a plurality of predetermined ranges comprised of possible output signal values, for calculating occurrence frequencies in respective ones of the ranges of the output signal values of each of said first and second sensors, for converting the calculated occurrence frequencies into driving condition signals, and for discriminating one of the types in accordance with the driving condition signals; and, control means for controlling the engine by selectively adjusting at least one of a plurality of actuators for controlling the engine in accordance with the discriminated type.

43. An electronic engine control apparatus useful for implementing a plurality of types of operation for a vehicle comprising:

a plurality of first sensors for detecting a driving action taken by a driver;

a plurality of second sensors for detecting operating conditions of the vehicle and an engine;

discriminating means for classifying output signal values of each of said first and second sensors into a plurality of predetermined ranges by supplying the measured values to a membership function utilized in Fuzzy theory, for calculating occurrence frequencies in respective ones of the ranges of the output signal value of each of said first and second sensors, for converting the calculated occurrence frequencies into driving condition signals, and for discriminating one of the types in accordance with the driving condition signals; and, control means for controlling the engine by selectively adjusting at least one of a plurality of actuators for controlling the engine in accordance with the discriminated type.

44. An electronic engine control apparatus useful for implementing a plurality of types of operation for a vehicle comprising:

a plurality of first sensors for detecting a driving action taken by a driver;

a plurality of second sensors for detecting operating conditions of the vehicle and an engine;

discriminating means for classifying output signal values of each of said first and second sensors measured during a predetermined period into a plurality of ranges by supplying the measured values to a membership function utilized in Fuzzy theory, for calculating occurrence frequencies in respective ranges of the output signal value of each of said first and second sensors, for converting the calculated occurrence frequencies into driving condition signals, and for discriminating one of the types in accordance with the driving condition signals; and, control means for controlling the engine by selectively adjusting at least one of a plurality of actuators for controlling the engine in accordance with the discriminated type.

45. An electronic engine control apparatus useful for implementing a plurality of types of operation for a vehicle comprising:

a plurality of first sensors including a gear shift sensor, a brake pedal sensor, an accelerator pedal sensor, and a steering sensor for detecting a driving action taken by a driver;

a plurality of second sensors for detecting operating conditions of the vehicle and an engine;

discriminating means for classifying output signal values of each of said first and second sensors including the gear shift sensor, the brake pedal sensor, the accelerator pedal sensor, and the steering sensor, into a plurality of ranges by supplying the measured values to a membership function utilized in Fuzzy theory, for calculating occurrence frequencies in respective ranges of the output signal value of each of said first and second sensors, for converting the calculated occurrence frequencies into driving condition signals, and for discriminating one of the types in accordance with the driving condition signals; and, control means for controlling the engine by selectively adjusting at least one of a plurality of actuators for controlling the engine in accordance with the discriminated type.

46. An electronic engine control apparatus useful for implementing a plurality of types of operation for a vehicle comprising:

a plurality of first sensors for detecting a driving action taken by a driver;

a plurality of second sensors for detecting operating conditions of the vehicle and an engine;

discriminating means for classifying output signal values of each of said first and second sensors measured during a predetermined period into a plurality of ranges, for calculating occurrence frequencies in respective ranges of the output signal value of each of said first and second sensors, for converting the calculated occurrence frequencies into driving condition signals, and for discriminating one of the types representing an intent of the driver, in accordance with the driving condition signals; and, control means for controlling the engine by selectively adjusting at least one of a plurality of actuators of controlling the engine in accordance with the discriminated type.

47. A method of controlling an internal combustion engine for a vehicle comprising the following steps:

detecting a plurality of driving actions made by an operator of the vehicle;

detecting a plurality of operating conditions of the vehicle;

estimating a driving condition of the vehicle comprising determining occurrence frequencies of the driving actions and operating conditions over a predetermined period; and, selectively adjusting engine operation in accordance with the estimated driving condition.

48. The method as described in claim 47 wherein said estimating further includes categorizing the driving actions and operating conditions into preselected ranges representative of a feature of the driving conditions.

49. The method as described in claim 48 wherein the pluralities of driving actions and operating conditions are processed with a membership function to determine data representative of the occurrence frequencies.

50. The method as described in claim 49 wherein the data representative of the occurrence frequencies is selectively weighted relative to a one driving condition to estimate an each driving condition representative of an each of the detected pluralities of the driving actions and the operating conditions.

51. The method as described in claim 50 wherein the estimating further includes summing the each driving condition estimated to determine the driving condition of the vehicle.

52. The method as described in claim 47 wherein the detecting comprises detecting driving actions and operating conditions for estimating the driving condition representative of a driving preference.

53. The method as described in claim 47 wherein the detecting comprises detecting driving actions and operating conditions estimating the driving conditions representative of a driving environment.

54. The method as described in claim 47 wherein the detecting comprises detecting driving actions and operating conditions for estimating the driving conditions representative of a driver's preference and driving environment.

55. The method as described in claim 47 wherein the detecting comprises detecting driving actions and operating conditions during transition conditions.

56. The method as described in claim 47 wherein the detecting comprises classifying driving actions including accelerator pedal actions into preselected driving action classes.

57. The method as described in claim 56 further including comparing a target acceleration rate of the vehicle with an actual vehicle acceleration rate and selectively adjusting a vehicle throttle valve to adjust the actual vehicle acceleration rate to the target acceleration rate in accordance with results of the comparing.

58. A condition adaptive-type control method for an internal combustion engine mounted on an automotive vehicle having a transmission mechanism, a brake pedal and an accelerator pedal, comprising the steps of:

categorizing a driver's preference and a vehicle driving environment, respectively, into a plurality of categories, and preparing different engine control methods for different combinations of said categories;

detecting a plurality of measurable variables including driving actions made by an operator of the vehicle comprising a state of engagement or disengagement of said transmission mechanism, an angle of said brake pedal and an angle of said accelerator pedal, and vehicle operating conditions comprising a speed of the vehicle;

determining possibility values for the categories to estimate a one present time driver's preference and a one present time driving environment, each having maximum possibility values, respectively, comprising processing occurrence frequencies of the measurable variables in a Fuzzy theory analysis relative to the categories to determine the possibility values, and associating the possibility values to identify the maximum possibility values; and, selecting one of said engine control methods in accordance with a combination of said categories corresponding to the one present time driver's preference and the one present time driving environment.

59. A method of controlling an internal combustion engine for an automotive vehicle comprising the following steps:

detecting a plurality of driving actions made by an operator of the vehicle;

detecting a plurality of operating conditions of the vehicle;

categorizing the driving actions and operating conditions with respect to plural types of the driving environment of the vehicle and/or a driver's preference for driveability;

estimating a present time one of the plural types by determining occurrence frequencies of the driving actions and the operating conditions over a predetermined period relative to preselected ranges representative of the plural types and by calculating a maximum possibility value of the present time one using the occurrence frequencies; and, selectively adjusting engine operation in accordance with the estimated present time one of the plural types.

* * * * *

UNITED STATES PATENT AND TRADEMARK OFFICE
CERTIFICATE OF CORRECTION

PATENT NO. : 5,189,621
DATED : February 23, 1993
INVENTOR(S) : Mikihiko Onari, et al.

It is certified that error appears in the above-identified patent and that said Letters Patent is hereby corrected as shown below:

Claim 28, column 25, lines 18-19, delete "preference" and substitute therefor --preferences--.

Claim 35, column 26, line 25, delete "is" and substitute therefor --if--.

Claim 37, column 26, line 53, delete "if" and substitute therefor --is--.

Claim 40, column 27, line 27, before "32" insert --to claim--.

Signed and Sealed this

Twenty-third Day of November, 1993

Attest:

BRUCE LEHMAN

Attesting Officer     Commissioner of Patents and Trademarks